United States Patent
Hirabayashi et al.

(10) Patent No.: US 9,731,410 B2
(45) Date of Patent: Aug. 15, 2017

(54) POWER TOOL

(75) Inventors: Shinji Hirabayashi, Anjo (JP); Kenichi Ota, Anjo (JP)

(73) Assignee: MAKITA CORPORATION, Anjo-shi (JP)

(*) Notice: Subject to any disclaimer, the term of this patent is extended or adjusted under 35 U.S.C. 154(b) by 981 days.

(21) Appl. No.: 13/989,918

(22) PCT Filed: Nov. 28, 2011

(86) PCT No.: PCT/JP2011/077381
§ 371 (c)(1),
(2), (4) Date: Jul. 10, 2013

(87) PCT Pub. No.: WO2012/073889
PCT Pub. Date: Jun. 7, 2012

(65) Prior Publication Data
US 2013/0284475 A1 Oct. 31, 2013

(30) Foreign Application Priority Data

Dec. 2, 2010 (JP) .................. 2010-269423
Aug. 11, 2011 (JP) .................. 2011-176429

(51) Int. Cl.
B25F 5/00 (2006.01)
H02K 7/14 (2006.01)
H02K 16/00 (2006.01)
B25B 23/00 (2006.01)
B25B 21/00 (2006.01)

(52) U.S. Cl.
CPC ............. *B25F 5/001* (2013.01); *B25B 23/00* (2013.01); *H02K 7/145* (2013.01); *H02K 16/00* (2013.01); *B25B 21/00* (2013.01)

(58) Field of Classification Search
CPC ......... B25F 5/008; B25F 5/001; H02K 7/145; H02K 16/00; B25B 23/00
(Continued)

(56) References Cited

U.S. PATENT DOCUMENTS 1,334,430 A 3/1920 Ayotte
4,721,169 A * 1/1988 Nagasawa ............... B25B 23/14
173/178

(Continued)

FOREIGN PATENT DOCUMENTS

CN 1519080 A 8/2004
CN 1810557 A 8/2006
(Continued)

OTHER PUBLICATIONS

Aug. 20, 2014 Office Action issued in Chinese Patent Application No. 201180057969.7 (with translation).
(Continued)

*Primary Examiner* — Michelle Lopez
*Assistant Examiner* — Chinyere Rushing-Tucker
(74) *Attorney, Agent, or Firm* — Oliff PLC

(57) ABSTRACT

To provide a hand-held power tool which is equipped with a motor and can be used in a normal driving mode for a tip end tool and also in driving modes other than the normal driving mode. A power tool in which a tip end tool is driven by a motor to thereby perform a predetermined machining process on a workpiece, wherein the motor is a dual rotor motor comprising: an inner rotor; an outer rotor; and a stator including a driving coil mechanism, with the inner rotor and the outer rotor being coaxially disposed.

29 Claims, 21 Drawing Sheets

(58) Field of Classification Search
USPC .......................................................... 310/50
See application file for complete search history.

(56) References Cited

U.S. PATENT DOCUMENTS

| | | | | |
|---|---|---|---|---|
| 5,954,144 | A * | 9/1999 | Thames | B23Q 5/16 173/216 |
| 6,373,160 | B1 * | 4/2002 | Schrodl | H02K 51/00 310/114 |
| 6,497,201 | B1 * | 12/2002 | Werson | F04D 13/06 123/41.12 |
| 6,983,810 | B2 | 1/2006 | Hara et al. | |
| 2004/0017119 | A1 * | 1/2004 | Yamamoto | H02K 29/08 310/68 B |
| 2005/0134126 | A1 * | 6/2005 | Ibach | F04D 25/0606 310/62 |
| 2006/0125344 | A1 * | 6/2006 | Yokota | B23D 45/00 310/264 |
| 2008/0100168 | A1 * | 5/2008 | Bremner | H02K 21/029 310/162 |
| 2008/0260485 | A1 * | 10/2008 | Jaillon | B23B 35/005 409/232 |
| 2009/0200053 | A1 * | 8/2009 | Scrimshaw | B23B 31/123 173/47 |
| 2010/0164422 | A1 * | 7/2010 | Shu | H02K 21/029 318/540 |
| 2010/0244616 | A1 * | 9/2010 | Li | H02K 1/146 310/216.069 |
| 2011/0156526 | A1 * | 6/2011 | Lau | H02K 9/06 310/216.129 |

FOREIGN PATENT DOCUMENTS

| | | |
|---|---|---|
| EP | 2106884 A2 | 10/2009 |
| GB | 1 569 532 A | 6/1980 |
| JP | A 60-245456 | 12/1985 |
| JP | A 4-334953 | 11/1992 |
| JP | A 5-502627 | 5/1993 |
| JP | A 9-254033 | 9/1997 |
| JP | A 2007-295773 | 11/2007 |
| JP | 2008141853 A | 6/2008 |
| WO | WO 92/01532 | 2/1992 |
| WO | WO 2010/044231 A1 | 4/2010 |
| WO | WO 2010/101008 A1 | 9/2010 |

OTHER PUBLICATIONS

Oct. 7, 2014 Office Action issued in Japanese Patent Application No. 2010-269423.
Oct. 21, 2014 Office Action issued in Japanese Patent Application No. 2011-176429.
Sep. 12, 2014 Search Report issued in European Patent Application No. 14176549.5.
Apr. 22, 2015 Search Report issued in European Patent Application No. 11844621.0.
Mar. 9, 2015 Office Action issued in Chinese Patent Application No. 201180057969.7.
Nov. 20, 2014 Office Action issued in European Patent Application No. 11803558.3.
Jan. 10, 2012 Search Report issued in International Patent Application No. PCT/JP2011/077381 (with translation).

* cited by examiner

POWER TOOL

FIELD OF THE INVENTION

The present invention relates to a power tool that performs a predetermined operation on a workpiece with a tool bit driven by a motor.

BACKGROUND OF THE INVENTION

Japanese laid-open patent publication No. 2007-295773 discloses a hand-held power tool which is capable of controlling output torque of a tool bit driven by a motor. This power tool is constructed to tighten a screw by giving impact in the circumferential direction and rotation to the tool bit in the form of a screw bit.

In the known screw tightening machine, however, by provision of the construction in which rotation and impact are given to the tool bit, it is likely to have a complicated device configuration by any means.

DISCLOSURE OF THE INVENTION

Problems to be Solved by the Invention

Accordingly, it is an object of the present invention to provide a power tool that can realize various kinds of required operations in a simple device configuration.

Means for Solving the Problem

In order to solve the above-described problem, according to a preferred embodiment of the present invention, a power tool is provided which performs a predetermined operation on a workpiece with a tool bit driven by a motor. The "predetermined operation" in the present invention represents an operation of tightening screws, bolts or the like by rotationally driving the tool bit in the form of a screw bit or a socket. It however widely includes not only the tightening operation, but a chipping or drilling operation by linearly driving a hammer bit or by rotationally driving it around its axis, and a cutting operation by rotationally driving a saw blade.

In the preferred embodiment of the power tool of the present invention, it is characterized in that the motor includes an inner rotor, an outer rotor and a stator having a driving coil mechanism and is configured as a dual rotor motor in which the inner rotor is arranged coaxially inside of the outer rotor.

The inner rotor and the outer rotor of the dual rotor motor can be driven and stopped independently from each other. Therefore, it may be constructed to drive the tool bit by using both the inner rotor and the outer rotor, or alternatively, to drive the tool bit by using one of the inner rotor and the outer rotor and drive an actuating member other than the tool bit by using the other rotor.

If it is constructed to drive the tool bit by using both the inner rotor and the outer rotor, for example, in the case of the power tool in the form of a screw tightening machine, it can be constructed to rotationally drive the tool bit in the form of a screw bit by using one of the rotors while giving impact to the screw bit in the circumferential direction by using the other rotor. Further, if it is constructed to drive the tool bit by using one of the inner rotor and the outer rotor and drive an actuating member other than the tool bit by using the other rotor, it can be constructed to drive the actuating member other than the tool bit, for example, in the form of a motor cooling fan. Thus, according to this invention, various kinds of required operations can be realized in a simple device configuration. Further, the dual rotor motor can be arranged coaxially with an output shaft which drives the tool bit. Therefore, for example, compared with a construction in which two motors are arranged in parallel, the machine body is not bulged outward so that the compact power tool can be provided.

According to a further embodiment of the power tool of the present invention, the stator is formed by a single member. In this case, the "driving coil mechanism" may be constructed to include an inner rotor driving coil for driving the inner rotor and an outer rotor driving coil for driving the outer rotor, or it may be constructed to include one driving coil for driving both the inner rotor and the outer rotor.

According to a further embodiment of the power tool of the present invention, the stator includes a plurality of members, or a first stator having an inner rotor driving coil for driving the inner rotor and a second stator having an outer rotor driving coil for driving the outer rotor.

According to a further embodiment of the power tool of the present invention, in the construction in which the stator includes the first stator and the second stator, the power tool has a housing for housing the dual rotor motor, and the inner motor includes the inner rotor and the first stator and the outer motor includes the outer rotor and the second stator. Further, the inner motor and the outer motor are arranged in the housing at positions displaced from each other in the longitudinal direction, and a space is formed between an outer circumferential region of the inner motor and the housing. The "longitudinal direction" in this invention refers to the axial direction of the rotation axis of the inner rotor and the outer rotor.

According to this embodiment, the outer circumferential region of the inner motor can be supported (fixed) from outside by the housing. Therefore, compared with a structure of supporting an end surface (side) of the inner motor in the longitudinal direction, it can be firmly supported with a simpler structure. Specifically, in order to support the outer circumferential region of the inner motor, the outer circumferential region of the first stator is fixed to the housing directly or via a supporting member such as an annular member.

According to a further embodiment of the power tool of the present invention, the first and second stators are partly aligned in contact with each other in a radial direction transverse to the longitudinal direction and connected together in the aligned region.

According to this embodiment, the first and second stators can be connected together in a rational manner. For example, mechanical connection using pins, screws or the like, connection via a resin layer by resin molding, or connection using an adhesive can be used.

According to a further embodiment of the power tool of the present invention, the outer motor is configured as an axial gap motor in which the outer rotor and the second stator are opposed to each other in the longitudinal direction. In such a case, preferably, the first and second stators are partly aligned in the longitudinal direction and connected together in the aligned region. Further, preferably, the outer circumferential region of the second stator of the outer motor is fixedly supported by the housing directly or via a supporting member.

According to this embodiment, the dual rotor motor using a normal radial gap motor and an axial gap motor can be provided.

According to a further embodiment of the power tool of the present invention, the power tool has a speed reducing mechanism. Further, the dual rotor motor drives the tool bit via the speed reducing mechanism, and the speed reducing mechanism has at least first and second speed reduction ratios and switches at least one of the inner and outer rotors between a driven state and a stopped state to thereby switch between the first and second speed reduction ratios. In this case, preferably, the switching between the speed reduction ratios is made according to any one of an electric current value, torque, rotation speed and temperature of the dual rotor motor.

According to a further embodiment of the power tool of the present invention, the output torque to be outputted to the tool bit is changed by the switching between the first and second speed reduction ratios.

According to this embodiment, the output torque of the tool bit can be changed by switching between the first and second speed reduction ratios. Therefore, the dual rotor motor can be used to drive the tool bit at high torque or low torque according to the load on the tool bit, during operation by the tool bit.

According to a further embodiment of the power tool of the present invention, the rotation speed of the tool bit is changed by the switching between the first and second speed reduction ratios.

According to this embodiment, the rotation speed of the tool bit can be changed between high speed and low speed by switching between the first and second speed reduction ratios. Therefore, by using the dual rotor motor, during operation by the tool bit, the tool bit can be driven at high speed in low load conditions, while it can be driven at low speed in high load conditions.

According to a further embodiment of the power tool of the present invention, the output torque of the tool bit is intermittently changed by continuously driving one of the inner rotor and the outer rotor and intermittently driving the other rotor.

According to this embodiment, the output torque of the tool bit can be intermittently changed. Therefore, for example, in the case of the power tool in the form of a screw tightening machine, by provision for intermittently changing the output torque of the tool bit after a screw is seated on the workpiece, the screw tightening machine of an impact type can be realized without need of using a mechanical mechanism such as a rotational impact mechanism for intermittently applying impact to the tool bit in the form of a screw bit in the direction of rotation.

According to a further embodiment of the power tool of the present invention, the speed reducing mechanism is formed by a planetary gear mechanism. Further, the planetary gear mechanism includes a sun gear and an internal gear which are coaxially arranged and a planetary gear which engages with both the sun gear and the internal gear and revolves around the sun gear. The internal gear is connected to the outer rotor and the sun gear is connected to the inner rotor. A difference of relative rotation between the sun gear and the internal gear is controlled by control of rotational driving of the outer rotor and the inner rotor, so that the revolution speed of the planetary gear is changed to switch the speed reduction ratio.

According to this embodiment, the dual rotor motor and the planetary gear mechanism can be connected to each other in a rational arrangement.

According to a further embodiment of the power tool of the present invention, in the construction in which the speed reducing mechanism is formed by the planetary gear mechanism, the inner rotor is constantly driven.

According to this embodiment, when the sun gear of the planetary gear mechanism is constantly driven by the inner rotor, the planetary gear which engages with the sun gear revolves while rotating. In this case, when the outer rotor is stopped, the internal gear is held in the stopped state. When the outer rotor is rotationally driven in the same direction as the inner rotor or in the opposite direction, the internal gear is rotationally driven in the same direction as the sun gear or in the opposite direction, so that the revolution speed of the planetary gear is changed. Thus, according to this embodiment, the speed reduction ratio of the planetary gear mechanism can be changed by switching the outer rotor between the driven state and the stopped state.

According to a further embodiment of the power tool of the present invention, in the construction in which the speed reducing mechanism is formed by the planetary gear mechanism, the outer rotor is constantly driven.

According to this embodiment, when the internal gear of the planetary gear mechanism is constantly driven by the outer rotor, the planetary gear which engages with the internal gear revolves while rotating. In this case, when the inner rotor is stopped, the sun gear is held in the stopped state. When the inner rotor is rotationally driven in the same direction as the outer rotor or in the opposite direction, the sun gear is rotationally driven in the same direction as the internal gear or in the opposite direction, so that the revolution speed of the planetary gear is changed. Thus, according to this embodiment, the speed reduction ratio of the planetary gear mechanism can be changed by switching the inner rotor between the driven state and the stopped state.

According to a further embodiment of the power tool of the present invention, the power tool includes a one-way clutch which is disposed between the outer rotor and the internal gear or between the inner rotor and the sun gear and transmits torque from the outer rotor and internal gear side to the tool bit side, but not in the reverse direction. The one-way clutch locks the internal gear or the sun gear against rotation according to torque on the tool bit and independently of rotation of the outer rotor or the inner rotor.

According to this embodiment, when the outer rotor or the inner rotor is stopped, the internal gear or the sun gear can be locked against rotation by the clutch. Therefore, reverse input of power from the internal gear or the sun gear to the outer rotor or the inner rotor can be interrupted, so that the motor can be protected.

According to a further embodiment of the power tool of the present invention, a fan is provided as the actuating member other than the tool bit. One of the inner rotor and the outer rotor of the dual rotor motor drives the tool bit and the other rotor drives the fan.

According to this embodiment, the fan provided as the actuating member other than the tool bit can be driven on the same axis.

According to a further embodiment of the power tool of the present invention, the outer rotor has an extending region formed on one end of the outer rotor in the longitudinal direction and extending forward of front ends of the stator and the inner rotor in the longitudinal direction. Further, the fan is disposed inside of the extending region of the outer rotor. With such a construction, a rational arrangement can be realized. In this case, the fan can be constructed to be constantly or intermittently driven.

According to a further embodiment of the power tool of the present invention, the fan is provided as a cooling fan for cooling the dual rotor motor. The cooling fan is constructed to be constantly driven, or to be intermittently driven according to at least one of the temperature, rotation speed, torque and electric current value of the dual rotor motor.

According to a further embodiment of the power tool of the present invention, the fan is provided as a dust collecting fan for collecting dust generated during operation and driven upon request for dust collection. The time of "request for dust collection" here typically represents the time when, in the case of the power tool in the form of a drilling or cutting tool, the tool bit is rotationally driven to perform a drilling or cutting operation.

EFFECT OF THE INVENTION

According to the present invention, a power tool is provided which can realize various kinds of required operations in a simple device configuration. Other objects, features and advantages of the present invention will be readily understood after reading the following detailed description together with the accompanying drawings and the claims.

REPRESENTATIVE EMBODIMENT FOR PERFORMING THE INVENTION

Each of the additional features and method steps disclosed above and below may be utilized separately or in conjunction with other features and method steps to manufacture and use improved power tools and methods for using them and devices utilized therein. Representative examples of the present invention, which examples utilized many of these additional features and method steps in conjunction, is now described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

(First Embodiment of the Invention)

Figure 1:
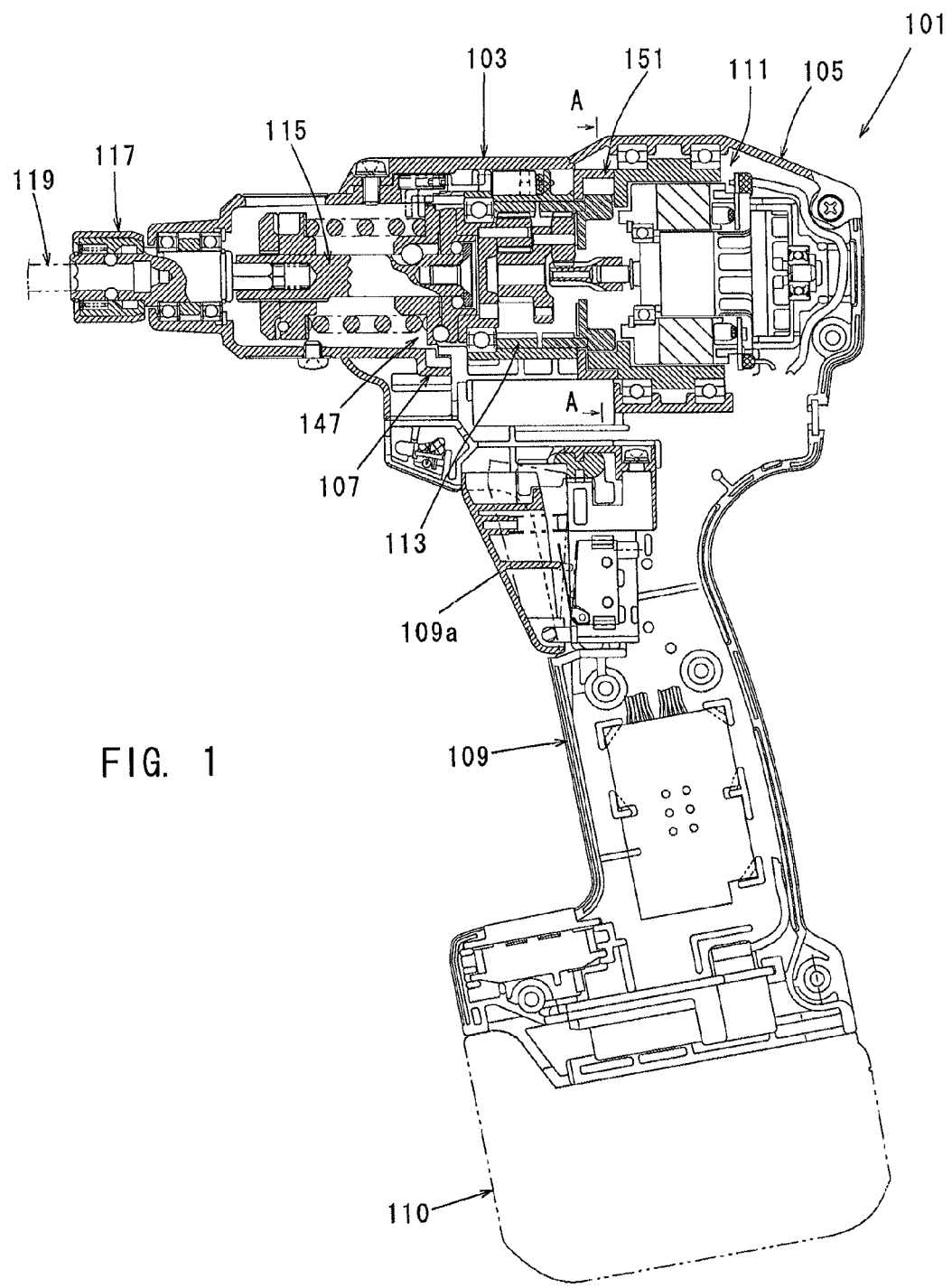
FIG. 1 is a sectional side view schematically showing an entire screwdriver according to a first embodiment of the present invention.

A first embodiment of the present invention is now described with reference to FIGS. 1 to 4. A battery-powered screwdriver is described as a representative embodiment of a hand-held power tool according to the present invention. FIG. 1 shows a screwdriver 101 according to this embodiment. As shown in FIG. 1, the screwdriver 101 according to this embodiment mainly includes a body 103 which forms an outer shell of the screwdriver 101, a screw bit 119 detachably coupled to a front end of a spindle 115 via a bit holder 117 in a front end region (left end region as viewed in FIG. 1) of the body 103, and a handgrip (handle) 109 connected integrally to the body 103. The body 103 and the screw bit 119 are features that correspond to the "tool body" and the "tool bit", respectively, according to the present invention. Further, in this embodiment, for the sake of convenience of explanation, the side of the screw bit 119 is taken as the front and the opposite side as the rear.

The body 103 mainly includes a motor housing 105 that houses a driving motor 111, and a gear housing 107 that houses a speed reducing mechanism in the form of a planetary gear mechanism 113 and an output shaft in the form of the spindle 115 in front (on the left as viewed in FIGS. 1 and 2) of the driving motor 111. The driving motor 111 is a feature that corresponds to the "motor" and the "dual rotor motor" according to the present invention. The motor housing 105 has right and left halves connected to each other and covers the entire region of the gear housing 107 other than its front end region for supporting the spindle 115. The handgrip 109 extends in a downward direction transverse to the longitudinal direction of the body 103 (the axial direction of the screw bit 119), and a battery pack 110 is removably attached to the extending end of the handgrip 109. The battery pack 110 contains a battery by which the driving motor 111 is powered.

Figure 2:
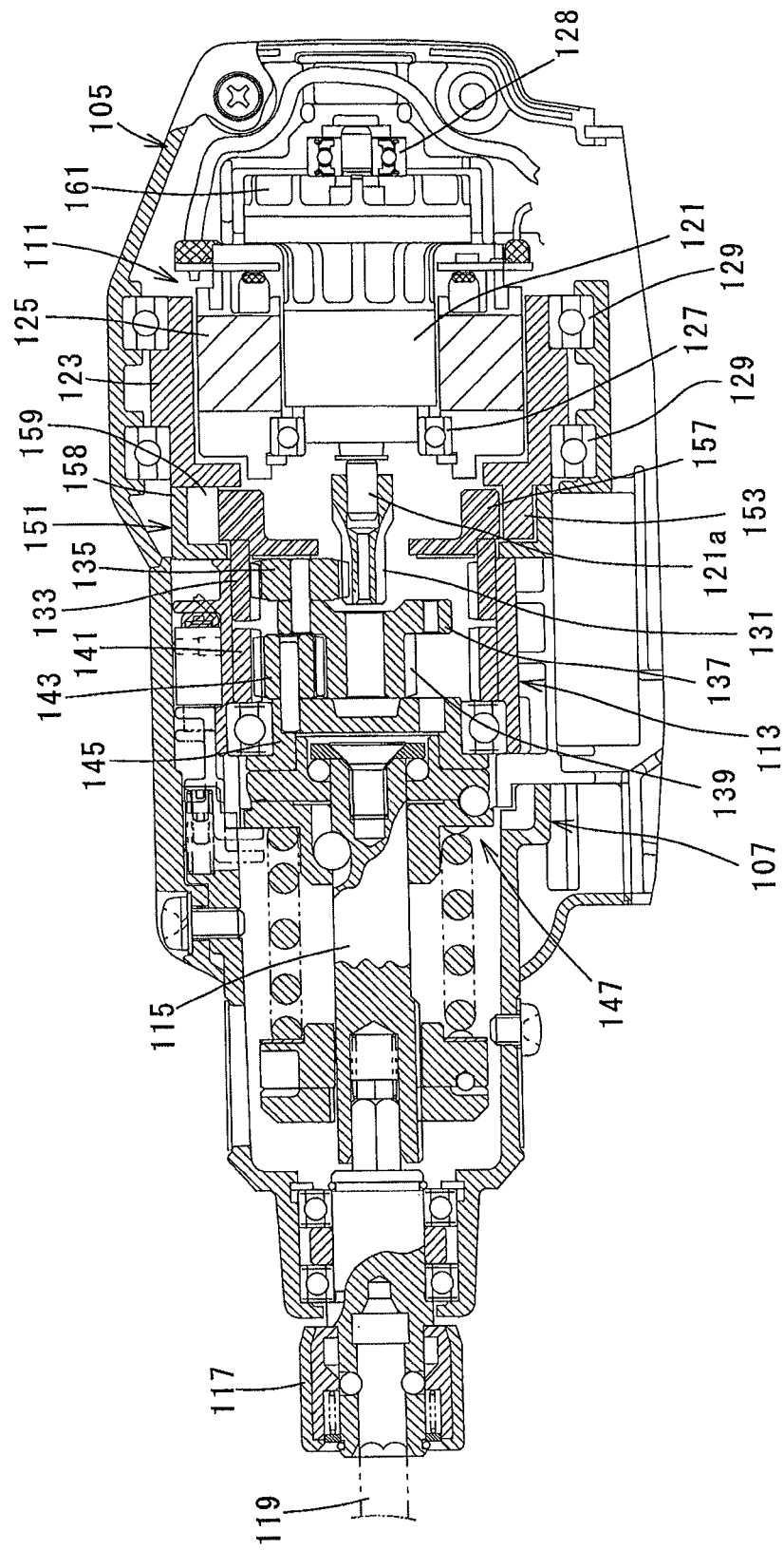
FIG. 2 is an enlarged sectional view of an essential part of the screwdriver.

FIG. 2 shows a construction of an essential part of the screwdriver. As shown in the drawing, the driving motor 111 includes an inner rotor 121 (first rotor), an outer rotor 123 (second rotor), and a stator 125 formed of a doughnut-shaped single member. An inner rotor driving coil (not shown) for driving the inner rotor 121 and an outer rotor driving coil (not shown) for driving the outer rotor 123 are wound on the stator 125. The driving motor 111 is a dual rotor motor having the inner rotor 121 and the outer rotor 123 arranged coaxially inside and outside of the stator 125, respectively. The inner rotor driving coil for driving the inner rotor 121 and the outer rotor driving coil for driving the outer rotor 123 form the "driving coil mechanism" according to this invention.

The stator 125 is generally doughnut-shaped and fixedly mounted at its rear end to the motor housing of the body 103. The inner rotor 121 inside of the stator 125 is rotatably supported at its front end with respect to the stator 125 via a bearing 127 and also rotatably supported at its rear end with respect to the motor housing 105 via a bearing 128. The outer rotor 123 is generally cylindrically shaped and rotatably supported at its front and rear ends of its outer circumferential surface with respect to the motor housing 105 via bearings 129. The inner rotor 121 and the outer rotor 123 are driven and stopped independently from each other.

The planetary gear mechanism 113 is disposed in front of the driving motor 111. The rotation output of the driving motor 111 is reduced in speed by the planetary gear mechanism 113 and transmitted to the spindle 115 and then to the screw bit 119 which is held by the spindle 115 via the bit holder 117. The planetary gear mechanism 113 is a feature that corresponds to the "speed reducing mechanism" according to the present invention.

The planetary gear mechanism 113 includes a first sun gear 131, a first internal gear (ring gear) 133, a plurality of first planetary gears 135, a first carrier 137, a second sun gear 139, a second internal gear 141, a plurality of second planetary gears 143 and a second carrier 145. The planetary gear mechanism 113 reduces the speed of the rotation output of an inner rotor shaft 121a and transmits the rotation output to the spindle 115.

The first sun gear 131 is connected to the inner rotor shaft 121a of the inner rotor 121 and rotates together. The first internal gear (ring gear) 133 is a ring-like member and has an outer surface rotatably supported with respect to the gear housing 107 and an inner surface having teeth. The first internal gear 133 is rotationally driven by the outer rotor 123. The first planetary gears 135 are engaged with the first sun gear 131 and the first internal gear 133 and revolve around the rotation axis of the first sun gear 131. The first carrier 137 rotatably supports the first planetary gears 135 and rotates around the same axis as the first sun gear 131. The second sun gear 139 is integrally formed on one (front) end of an outer circumferential surface of the first carrier 137 in the axial direction. The second internal gear 141 is fixed to the gear housing 107 and held in the stopped state at all times. The second planetary gears 143 are engaged with the second sun gear 139 and the second internal gear 141 and revolve around the rotation axis of the second sun gear 139. The second carrier 145 rotatably supports the second planetary gears 143 and is connected to the spindle 115 via an overload clutch 147.

The overload clutch 147 is a known machine element which is provided to interrupt transmission of torque from the second carrier 145 to the spindle 115 when an excessive load is applied to the spindle 115. Therefore, its detailed description is omitted. Further, the planetary gear mechanism 113 of this embodiment is constructed to have two carriers, or the first carrier 137 for supporting the first planetary gears 135 and the second carrier 145 for supporting the second planetary gears 143, which are connected in series in the axial direction, but it is not necessary to have two carriers.

Figure 3:
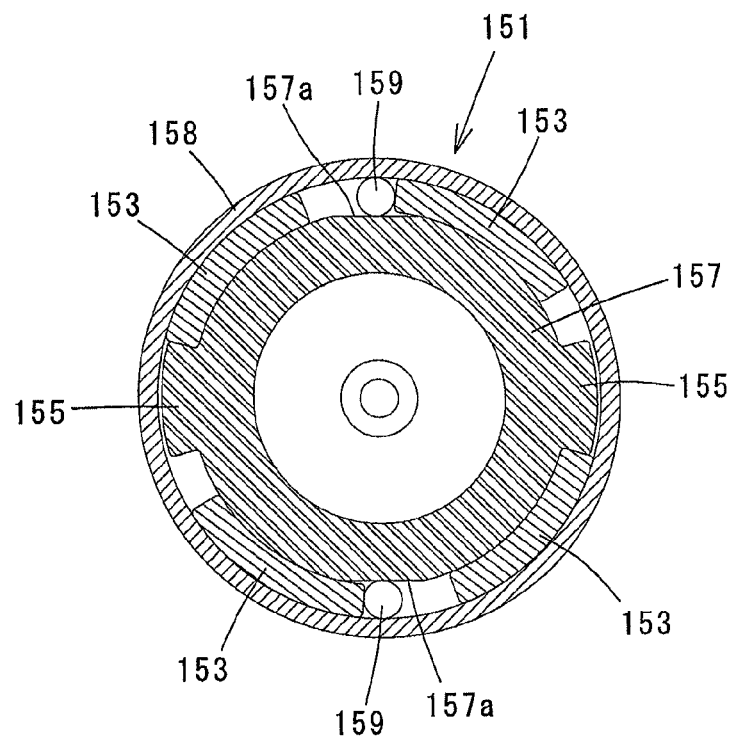
FIG. 3 is a sectional view of a bi-directional one-way clutch, taken along line A-A in FIG. 1, in a lock released state.
Figure 4:
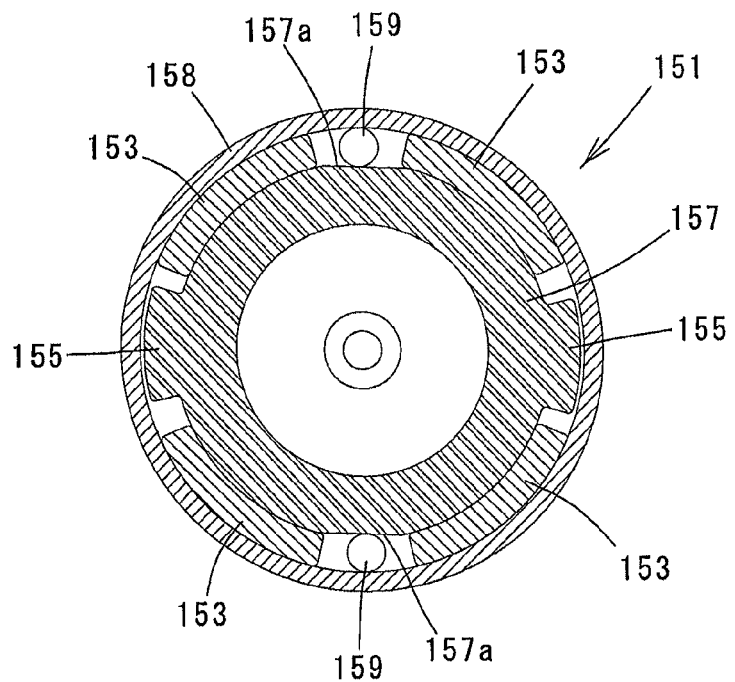
FIG. 4 is also a sectional view of the bi-directional one-way clutch, taken along line A-A in FIG. 1, in a locked state.
Figure 5:
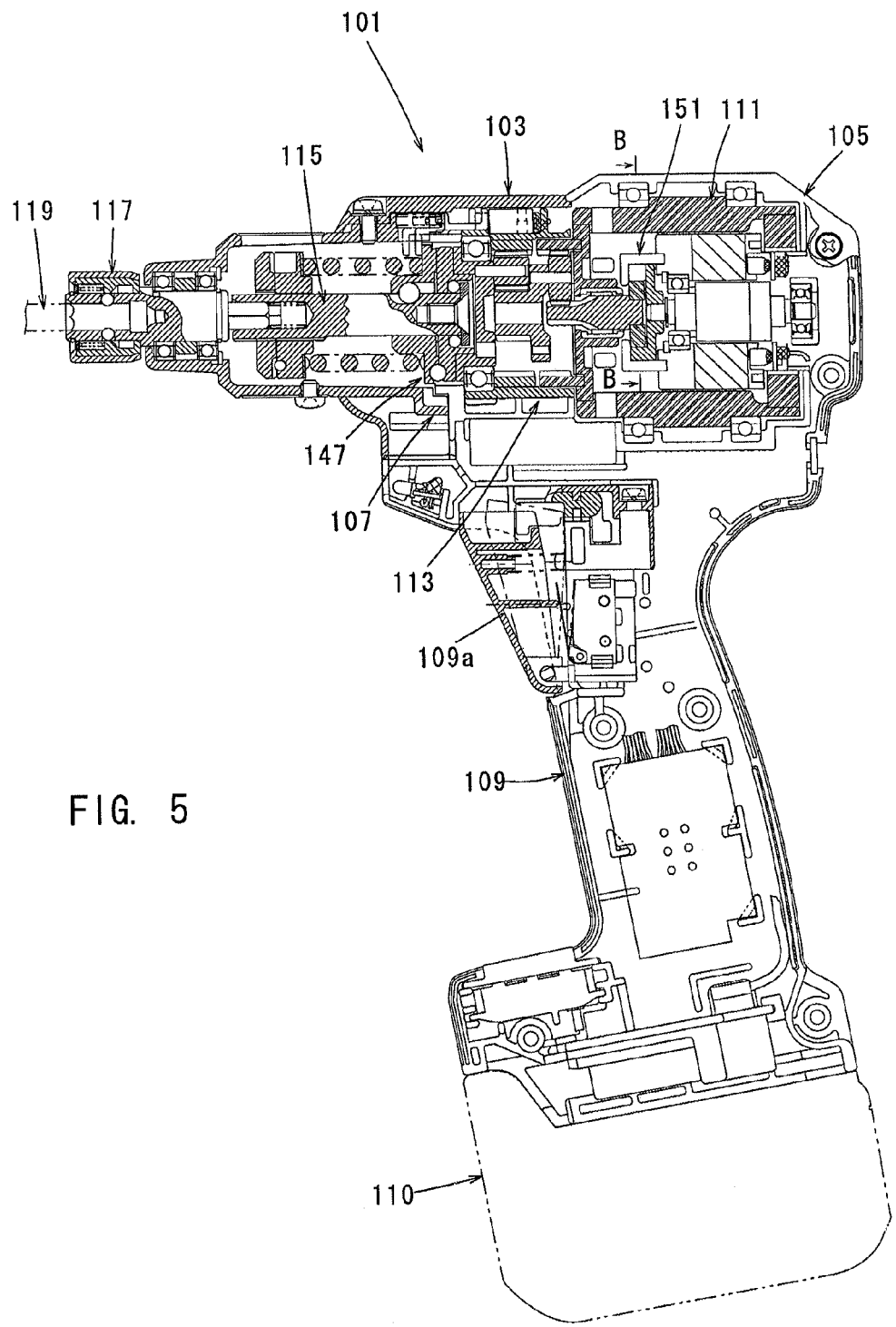
FIG. 5 is a sectional side view schematically showing a screwdriver according to a second embodiment of the present invention.
Figure 6:
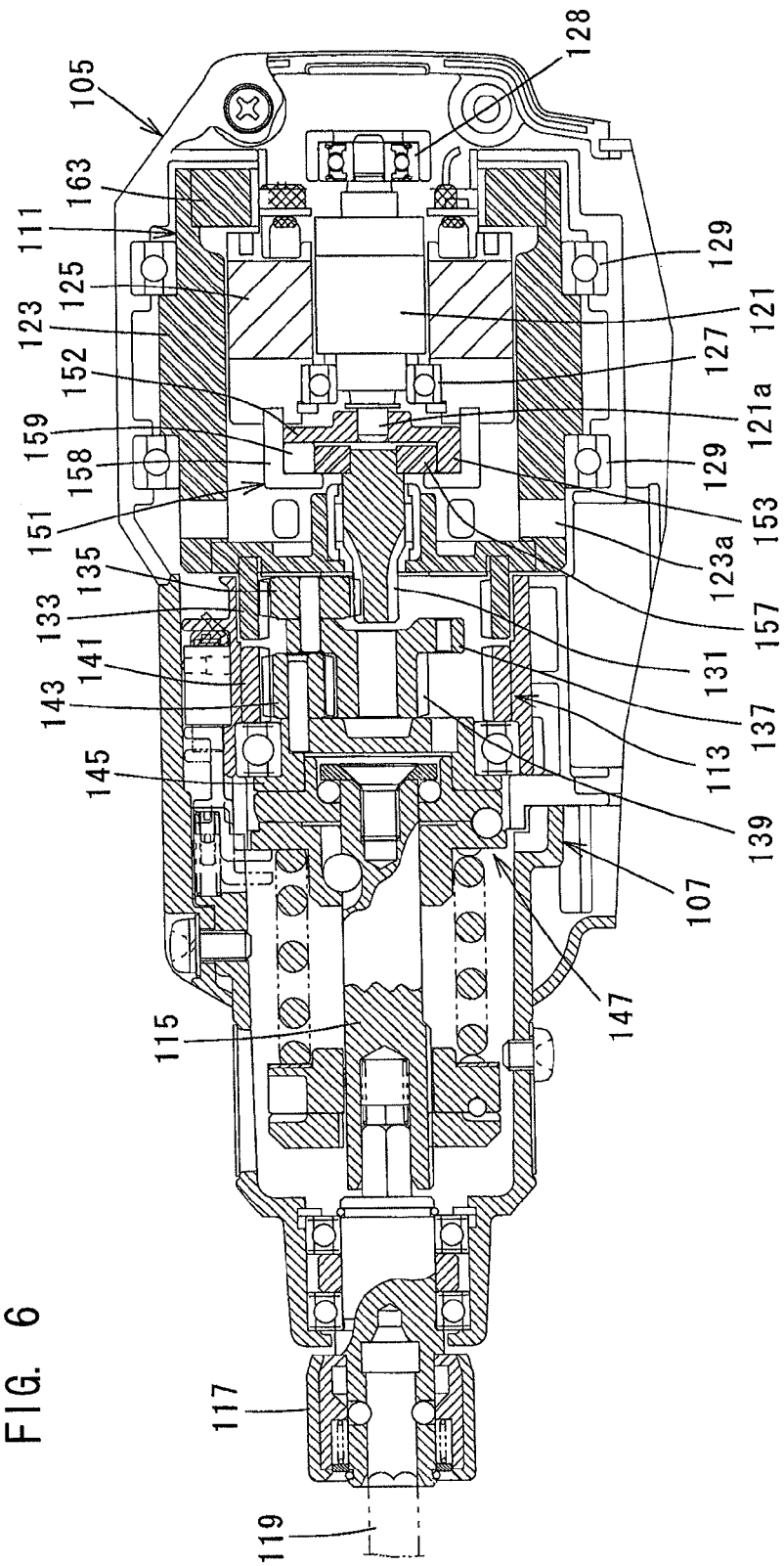
FIG. 6 is an enlarged sectional view of an essential part of the screwdriver.

The outer rotor 123 is connected to the first internal gear 133 of the planetary gear mechanism 113 via a bi-directional one-way clutch 151. The bi-directional one-way clutch 151 is a feature that corresponds to the "clutch" according to the present invention. As shown in FIGS. 3 and 4, the bi-directional one-way clutch 151 mainly includes a ring-like fixed outer ring 158 which forms an outer shell of the bi-directional one-way clutch 151 and is integrally formed with the gear housing 107, a power transmitting part 153 which is integrally formed with an input shaft in the form of the outer rotor 123, a power receiving member 157 which is connected to the first internal gear 133, and a columnar lock pin 159 which is disposed between the power transmitting part 153 and the power receiving member 157. The lock pin 159 locks the first internal gear 133 against rotation when torque is inputted from the first internal gear 133 on the output side to the outer rotor 123 on the input side.

The power transmitting part 153 consists of a plurality of members having a circular arc section and extending a predetermined length from the front end region of the outer rotor 123 in the axial direction, at predetermined intervals in the circumferential direction (four at 90-degree intervals in this embodiment). The power transmitting parts 153 are disposed for relative rotation inside of the fixed outer ring 158. The power receiving member 157 has a disc-like shape having a circular hole through which the first sun gear 131 can be loosely inserted. The power receiving member 157 is disposed for relative rotation inside of the power transmitting parts 153. The power receiving member 157 has two power receiving parts 155 formed on its outer surface with a 180-degree phase difference and protruding radially outward. The power receiving parts 155 are disposed with a predetermined clearance in the circumferential direction in two of the spaces which are defined between adjacent ones of the power transmitting parts 153 and have a 180-degree phase difference. The lock pins 159 are disposed in the other two of the spaces defined between adjacent ones of the power transmitting parts 153 and having a 180-degree phase difference.

When the outer rotor 123 is rotationally driven clockwise, one of the power transmitting parts 153 disposed on the opposite sides of the power receiving part 155 of the power receiving member 157 gets into contact with the power receiving part 155 in the circumferential direction and transmits torque to the first internal gear 133 in the clockwise direction. When the outer rotor 123 is rotationally driven counterclockwise, the other power transmitting part 153 disposed on the opposite side of the power receiving part 155 gets into contact with the power receiving part 155 in the circumferential direction and transmits torque to the first internal gear 133 in the counterclockwise direction. FIG. 3 shows the state in which the outer rotor 123 is rotationally driven counterclockwise.

The lock pins 159 are disposed between the outer surface of the power receiving member 157 and the inner surface of the fixed outer ring 158 in the spaces defined between the adjacent power transmitting parts 153. A planar region 157a is tangentially formed on the outer surface of the power receiving member 157 in the spaces in which the lock pins are disposed. Therefore, as shown in FIG. 3, when the outer rotor 123 is rotationally driven, each of the lock pins 159 is about to be wedged into a wedge-shaped space between the outer surface of the power receiving member 157 and the inner surface of the fixed outer ring 158 by the difference of relative rotation between the power receiving member 157 and the fixed outer ring 158. At this time, however, the lock pin 159 is pushed by a front end surface of the power transmitting part 153 in the rotation direction and held on the planar region 157a. Therefore, the lock pin 159 is not wedged in and the torque of the outer rotor 123 is transmitted to the first internal gear 133 via the power receiving member 157.

When torque is inputted from the output side to the input side, or more specifically, for example, when load is applied to the first internal gear 133 (the spindle 115) side and the power receiving member 157 is about to rotate with respect the power transmitting part 153 in the state shown in FIG. 4, the power receiving member 157 is locked in contact with the inner surface of the fixed outer ring 158 via the lock pins 159. Specifically, the lock pins 159 are wedged into the wedge-shaped spaces between the outer surface of the power receiving member 157 and the inner surface of the fixed outer ring 158, so that the power receiving member 157 is locked to the fixed outer ring 158.

As described above, the bi-directional one-way clutch 151 is provided as a machine element which can transmit torque of the outer rotor 123 on the input (driving) side to the first internal gear 133 (the spindle 115) on the output (driven) side both in the clockwise and counterclockwise directions. Moreover, when torque is about to be inputted reversely from the output side to the input side by load applied to the output side, the bi-directional one-way clutch 151 locks the first internal gear 133 and interrupts transmission of torque from the output side to the input side both in the clockwise and counterclockwise directions.

In this embodiment, when the first internal gear 133 is locked and the inner rotor 121 of the driving motor 111 is electrically driven, the spindle 115 is caused to rotate at a certain reduction ratio predetermined in the planetary gear mechanism 113. In this state, when the outer rotor 123 is rotated in the same direction as the inner rotor 121, the first internal gear 133 serving as a reaction force receiving member rotates in the same direction as the first sun gear 131. As a result, the number of revolutions of the first planetary gears 135 around the first sun gear 131 increases by the number of rotations of the first internal gear 133, so that the rotation speed of the spindle 115 increases. On the other hand, when the outer rotor 123 is rotated in the opposite direction, the number of revolutions of the first planetary gears 135 decreases by the number of rotations of the first internal gear 133, so that the rotation speed of the spindle 115 decreases.

In this manner, according to this embodiment, the outer rotor 123 can be switched between the stopped state and the driven state in which it is driven in the same direction as the inner rotor 121 or in the opposite direction, while the inner rotor 121 is constantly and continuously driven. By this switching, the revolution speed of the first planetary gears 135 (the rotation speed of the first carrier 137) can be changed so that the speed reduction ratio of the planetary gear mechanism 113 can be changed. Specifically, the output torque and the rotation speed to be outputted to the spindle 115 can be changed by changing the speed reduction ratio of the planetary gear mechanism 113. Further, the speed reduction ratio is changed according to load on the spindle 115 such as the driving current, torque, rotation speed and temperature of the driving motor 111. The speed reduction ratios set by switching the outer rotor 123 to the stopped state and the driven state while the inner rotor 121 is constantly driven are features that correspond to the "first and second speed reduction ratios", respectively, according to this embodiment.

In order to tighten a fastener such as a screw and a bolt (hereinafter referred to as a screw or the like) by using the screwdriver 101, the screw or the like is pressed against a workpiece via the screw bit 119, and in this state, a trigger 109a on the handgrip 109 is depressed to drive the driving motor 111. As a result, the spindle 115 is rotationally driven via the planetary gear mechanism 113, and the screw bit 119 rotates together with the spindle 115 and is allowed to perform the operation of tightening a screw or the like.

In this case, in this embodiment, the first sun gear 131 is constantly driven by the inner rotor 121 of the driving motor 111, and the first internal gear 133 can be driven and stopped by the outer rotor 123.

Specifically, the outer rotor 123 is intermittently driven, or repeatedly alternates between driving and stopping while the screw bit 119 is driven by constantly driving the inner rotor 121. In this manner, the screw bit 119 which is being driven at an output torque outputted by the inner rotor 121 intermittently gains the output torque outputted by the outer rotor 123. Thus, torque for driving the screw bit 119 can be intermittently changed. In the following description, intermittent torque change is also referred to as a torque ripple.

Thus, according to this embodiment, by intermittently driving the outer rotor 123, the operation of temporarily increasing the output torque to be outputted to the screw bit 119 and then immediately returning it to its initial state can be repeated. As a result, a smaller reaction force is required to hold the screwdriver 101. Therefore, the screwdriver 101 can be provided which can perform a screw tightening operation at a higher tightening torque than a usual tightening torque and is easy for a user to hold.

It may be constructed such that torque ripple is caused by intermittent driving of the outer rotor 123 all the way through the screw tightening operation of the screw bit 119 which is constantly driven by the inner rotor 121, or such that it is caused somewhere in the screw tightening operation. In order to cause torque ripple somewhere, suitably, for example, torque ripple may be caused by intermittently driving the outer rotor 123 when load (tightening torque) increases upon seating of the screw on the workpiece during screw tightening operation of the screw bit 119 driven by the inner rotor 121.

Therefore, according to this embodiment, the impact type screwdriver 101 equivalent to one having a mechanical rotary impact mechanism which intermittently applies impact force to the screw bit 119 in the direction of rotation can be obtained without such a rotary impact mechanism. Further, in the case of the construction in which the outer rotor 123 is intermittently driven somewhere during driving of the screw bit 119 by the inner rotor 121, for example, at least one of the driving current, torque, rotation speed and temperature of the constantly driven inner rotor 121 may be detected by a detector, and a motor control device (controller) which is not shown may be used to control such that the outer rotor 123 starts intermittent driving when the value detected by the detector reaches a predetermined value.

The first internal gear 133 receives a reaction force when the screw bit 119 is rotationally driven by the inner rotor 121. Therefore, the outer rotor 123 needs to generate higher torque than the inner rotor 121 in order to cause torque ripple by driving of the outer rotor 123. During the time when torque ripple is not caused, or when the screw bit 119 is driven only by driving of the inner rotor 121, the first internal gear 133 needs to be held in the locked state. If the first internal gear 133 is held in the locked state only by torque of the outer rotor 123, the outer rotor 123 is used in the locked state, which may cause motor burnout. According to this embodiment, however, the bi-directional one-way clutch 151 is provided between the outer rotor 123 and the first internal gear 133 of the planetary gear mechanism 113 and interrupts reverse input of power from the first internal gear 133 on the driven side to the outer rotor 123 on the input side so that the first internal gear 133 can be held in the locked state. Thus, the outer rotor 123 can be protected from burnout.

Further, in this embodiment, the rotation axis of the dual rotor motor which forms the driving motor 111 is arranged coaxially with the spindle 115 which drives the screw bit 119. Therefore, for example, compared with a construction in which two motors are arranged in parallel, the machine body is not bulged outward so that the compact screwdriver 101 can be provided.

Further, in this embodiment, a cooling fan 161 for cooling the motor is provided on the inner rotor 121 which is constantly driven. The cooling fan 161 is provided on an axial end (rear end) of the inner rotor 121 facing away from the first sun gear 131. The cooling fan 161 serves to cool the driving motor 111 by taking outside air into the space of the motor housing 105 through an inlet (not shown) formed in the rear end of the motor housing 105, leading it forward in the longitudinal direction and then discharging it to the outside through an outlet (not shown) formed in the front of the housing.

(Second Embodiment of the Invention)

A second embodiment of the present invention is now described with reference to FIGS. 5 to 8. In this embodiment, the first internal gear 133 is constantly driven by the outer rotor 123, and the first sun gear 131 can be driven and stopped by the inner rotor 121. To this end, the outer rotor 123 is directly connected to the first internal gear 133, and the bi-directional one-way clutch 151 is disposed between the inner rotor shaft 121*a* of the inner rotor 121 and the first sun gear 131. In the other points, this embodiment has the same construction as the above-described first embodiment. Therefore, components in this embodiment which are substantially identical to those in the first embodiment are given like numerals as in the first embodiment.

The bi-directional one-way clutch 151 has basically the same construction and function as that in the first embodiment. Due to arrangement of the bi-directional one-way clutch 151 between the inner rotor shaft 121*a* and the first sun gear 131, however, the fixed outer ring 158 which forms the outer shell of the bi-directional one-way clutch 151 is connected to the front surface of the stator 125 of the driving motor 111 and has a generally cup-like shape having a circular central opening through which the first sun gear 131 is loosely inserted. Further, four power transmitting parts 153 are disposed at predetermined intervals in the circumferential direction and integrally formed with a disc-like power transmitting member 152. The power transmitting member 152 is connected to the inner rotor shaft 121*a* and rotates together with the inner rotor shaft 121*a*. The power receiving member 157 having the power receiving parts 155 is connected to the first sun gear 131 and rotates together with the first sun gear 131. In the other points, the bi-directional one-way clutch 151 has the same construction as that in the first embodiment.

Figure 7:
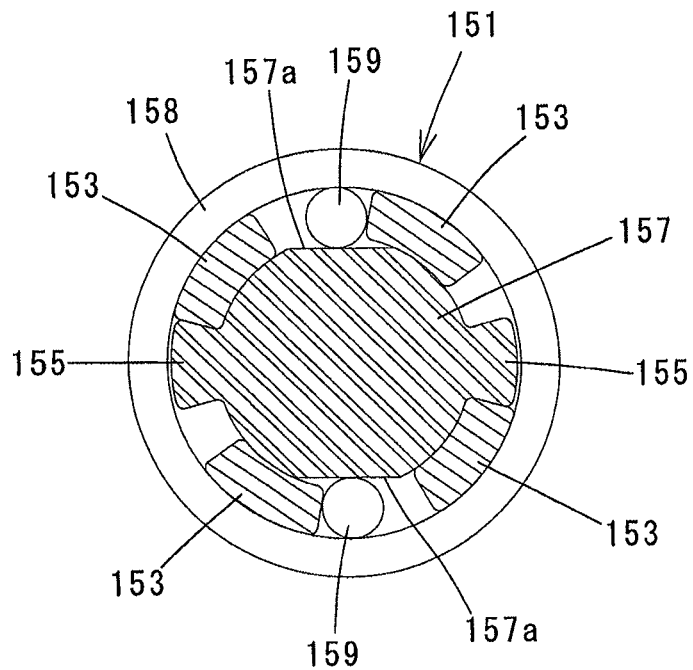
FIG. 7 is a sectional view of a bi-directional one-way clutch, taken along line B-B in FIG. 5, in a lock released state.
Figure 8:
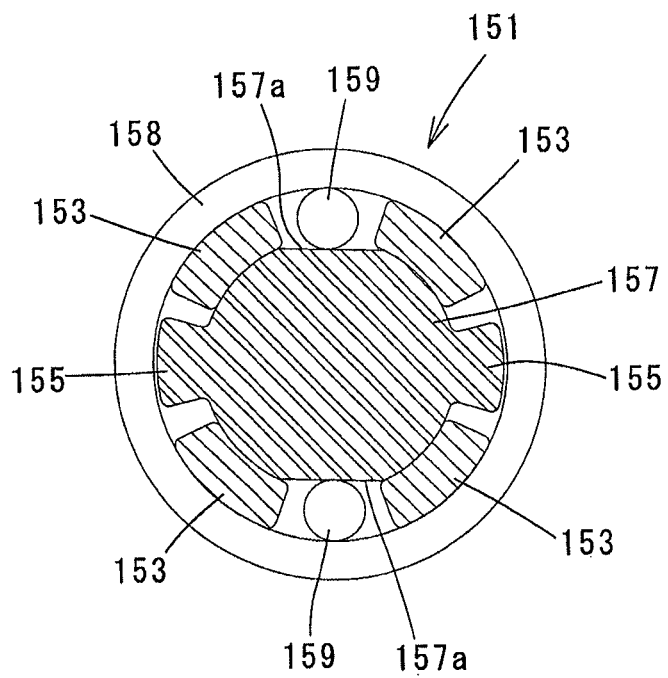
FIG. 8 is also a sectional view of the bi-directional one-way clutch, taken along line B-B in FIG. 5, in a locked state.

Therefore, when the inner rotor 121 is driven, as shown in FIG. 7, the lock pin 159 is pushed by the front end surface of the power transmitting part 153 in the rotation direction, so that each of the lock pins 159 is not wedged into a wedge-shaped space between the outer surface of the power receiving member 157 and the inner surface of the fixed outer ring 158. Therefore, the power transmitting part 153 comes into contact with the power receiving part 155 in the circumferential direction and transmits torque to the first sun gear 131. When torque is inputted from the output side to the input side, or more specifically when load is applied to the first sun gear 131 (the spindle 115) side and the power receiving member 157 is about to rotate with respect the power transmitting member 152 in the state shown in FIG. 8, the lock pins 159 are wedged into the wedge-shaped spaces between the outer surface of the power receiving member 157 and the inner surface of the fixed outer ring 158, so that the power receiving member 157 is locked to the fixed outer ring 158.

Specifically, when the inner rotor 121 on the input (driving) side is driven, the bi-directional one-way clutch 151 can transmit torque of the inner rotor 121 to the first sun gear 131 (the spindle 115) on the output (driven) side both in the clockwise and counterclockwise directions. Moreover, when torque is about to be inputted reversely from the output side to the input side by load applied to the output side, the bi-directional one-way clutch 151 locks the first sun gear 131 and interrupts transmission of torque from the output side to the input side both in the clockwise and counterclockwise directions.

In this embodiment, the first internal gear 133 is constantly driven by the outer rotor 123 of the driving motor 111, and the first sun gear 131 can be driven and stopped by the inner rotor 121. Therefore, while the spindle 115 (the screw bit 119) is driven by driving the outer rotor 123, the inner rotor 123 is intermittently driven, or repeatedly alternates between driving and stopping. In this manner, the screw bit 119 which is being driven at an output torque outputted by the outer rotor 123 intermittently gains the output torque outputted by the inner rotor 121. Thus, according to this embodiment, torque for driving the screw bit 119 can be intermittently changed.

Thus, according to this embodiment, by intermittently driving the inner rotor 121, the operation of temporarily increasing the output torque to be outputted to the screw bit 119 and then immediately returning it to its initial state can be repeated. Therefore, for example, when load (tightening torque) increases upon seating of the screw on the workpiece during screw tightening operation, torque ripple can be caused by intermittently driving the inner rotor 121, and the screw tightening operation can be performed at a higher tightening torque than a normal tightening torque.

Further, in this embodiment, the first sun gear 131 receives a reaction force when the screw bit 119 is rotationally driven by the outer rotor 121. Therefore, the inner rotor 121 needs to generate higher torque than the outer rotor 123 in order to cause torque ripple by intermittent driving of the inner rotor 123. During the time when torque ripple is not caused, the first sun gear 131 needs to be held in the locked state by stopping driving the inner rotor 121. If the first sun gear 131 is held in the locked state only by torque of the inner rotor 121, motor burnout may be caused. According to this embodiment, however, the bi-directional one-way clutch 151 provided between the inner rotor 121 and the first sun gear 131 can interrupt reverse input of power from the driven-side first sun gear 131 to the input-side inner rotor 121 and hold the first internal gear 133 in the locked state. Thus, the outer rotor 123 can be protected from burnout.

Further, in this embodiment, a cooling fan 163 for cooling the motor is provided on the outer rotor 123 which is constantly driven. The cooling fan 163 is provided on the inner circumferential surface of an axial end (rear end) of the outer rotor 123 on the opposite side from the first internal gear 133. The cooling fan 163 serves to cool the driving motor 111 by taking outside air into the space of the motor housing 105 through an inlet formed in the rear end of the motor housing 105 and leading it forward in the longitudinal direction. The air taken into the motor housing space cools the driving motor 111 by flowing into the motor through gaps between the stator 125 and the outer rotor 123 and between the stator 125 and the inner rotor 121. Thereafter, the air flows out to the outside of the motor through a radially extending communication hole 123*a* formed through a front end region of the outer rotor 123. The air then further passes between the motor housing 105 and the gear housing 107 and is discharged to the outside through an outlet.

According to this embodiment, not only the above-described effects but the same effects as the first embodiment can be obtained, which are not described in order to avoid redundant description.

(Third Embodiment of the Invention)

A third embodiment of the present invention is now described with reference to FIGS. 1 to 4. In this embodiment, the screw bit 119 is constantly driven by using one of the rotors, and in this state, the speed reduction ratio of the planetary gear mechanism 113 can be changed according to the load (tightening torque) on the screw bit 119 (the spindle 115) by using the other rotor, so that the rotation speed (screw tightening speed) of the screw bit 119 can be automatically changed.

The entire construction of the screwdriver 101 is the same as the above-described first embodiment and therefore it is not described. In this embodiment, it is constructed such that the inner rotor 121 and the outer rotor 123 are simultaneously driven when the trigger 109*a* is depressed.

For example, when the load is low until the screw is seated on the workpiece (the head of the screw comes into contact with the workpiece) after start of the screw tightening operation, the first internal gear 133 receives a small reaction to the rotation driving force. In this state, the first sun gear 131 is rotationally driven by the inner rotor 121, and the first internal gear 133 is rotationally driven in the direction of rotation of the first sun gear 131. Therefore, the screw bit 119 is rotated together with the spindle 115 at high speed at the speed reduction ratio at which the first sun gear 131 and the first internal gear 133 rotate together.

When the screw is seated on the workpiece and the load is increased, the first internal gear 133 receives an increased reaction to the rotation driving force. At this time, since the driving force of the outer rotor 123 is low, the torque of the outer rotor 123 succumbs to this reaction force, so that the first internal gear 133 is about to be rotated in the reverse direction. As a result, the bi-directional one-way clutch 151 is actuated and locks the first internal gear 133 to the fixed outer ring 158. Therefore, the screw bit 119 is rotated together with the spindle 115 at low speed at the speed reduction ratio at which only the first sun gear 131 rotates. The low-speed rotation of the spindle 115 is detected, for example, by electric current values. Specifically, a current detector is used to detect that the driving current of the outer rotor 123 has reached a predetermined value. The motor control device (controller) receives this detected signal and stops energization for driving the outer rotor 123, so that the outer rotor 123 can be protected from burnout. The speed reduction ratio at which the first sun gear 131 and the first internal gear 133 rotate together and the speed reduction ratio at which only the first sun gear 131 rotates are features that correspond to the "first and second speed reduction ratios", respectively, according to this invention.

According to this embodiment, the spindle 115 can be rotated at high speed in low load conditions in which the tightening torque is low, while it can be rotated at low speed in high load conditions in which the tightening torque is increased. With this construction, a screw tightening operation can be performed more rapidly with higher accuracy. Further, according to this embodiment, it can be provided such that the output torque of the outer rotor 123 is lower than the output torque of the inner rotor 121, so that the outer rotor 123 can be reduced in size.

(Fourth Embodiment of the Invention)

Figure 9:
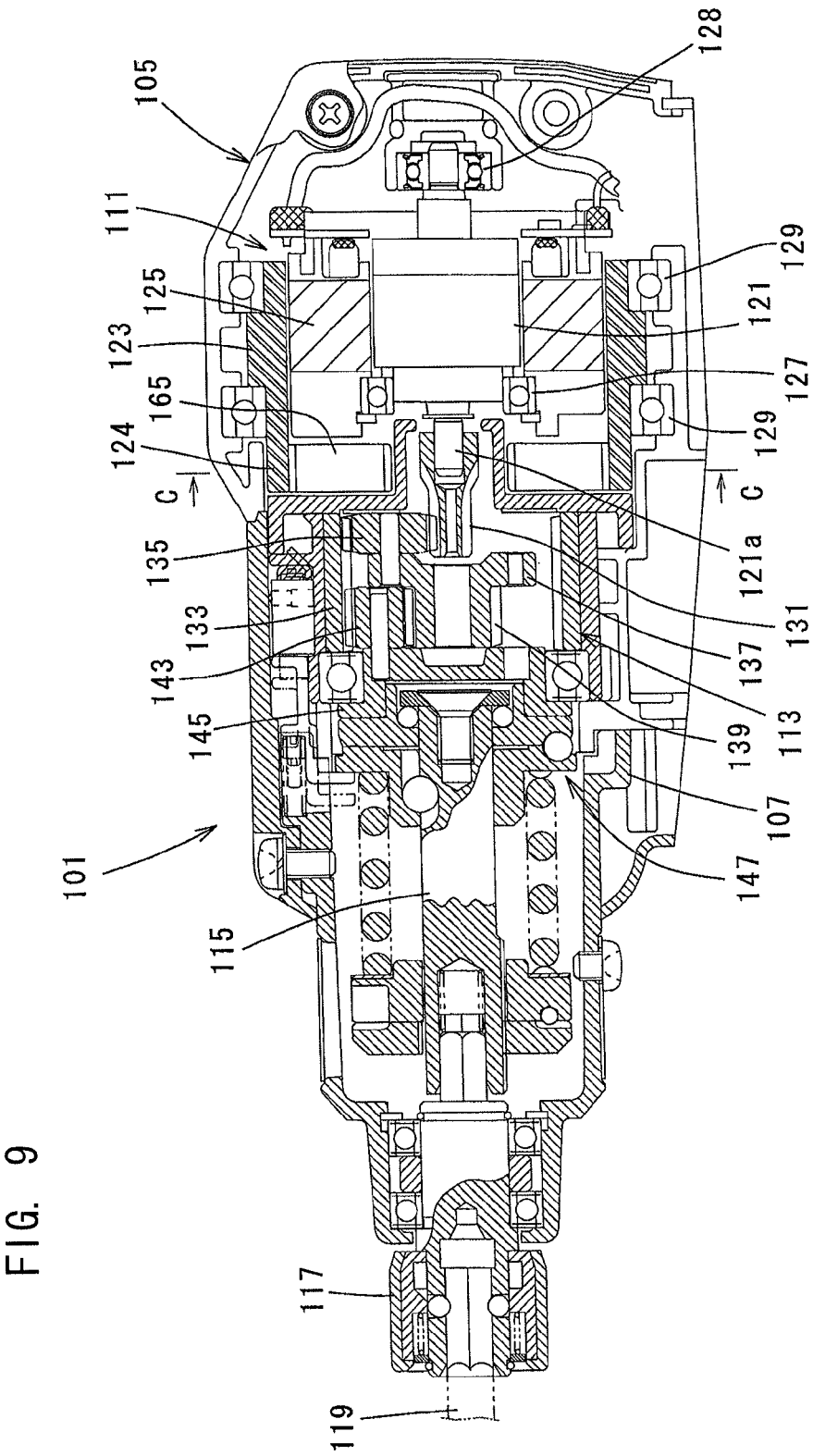
FIG. 9 is a sectional side view schematically showing a screwdriver according to a fourth embodiment of the present invention.
Figure 10:
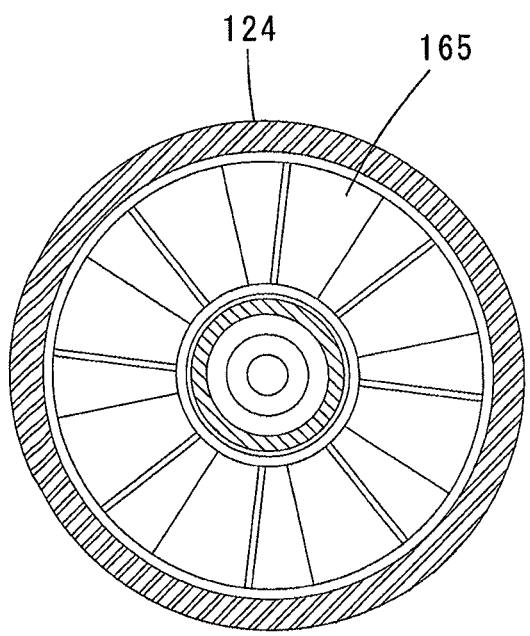
FIG. 10 is a sectional view showing a cooling fan, taken along line C-C in FIG. 9.

A fourth embodiment of the present invention is now described with reference to FIGS. 9 and 10. In this embodiment, in the battery-powered screwdriver 101, the first sun gear 131 of the planetary gear mechanism 113 is driven by the inner rotor 121 to rotationally drive the spindle 115 (the screw bit 119) via the planetary gear mechanism 113, while a cooling fan 165 is driven by the outer rotor 123. In the other points, this embodiment has generally the same construction as the first embodiment except that the bi-directional one-way clutch 151 is not provided and the first and second internal gears 133, 141 are formed in one piece and fixed to the gear housing 107 side in the planetary gear mechanism 113. Therefore, components in this embodiment which are substantially identical to those in the first embodiment are given like numerals as in the first embodiment, and they are not described.

A cylindrical fan housing part 124 is formed on one (front) end of the outer rotor 123 in the longitudinal direction and extends forward of the front ends of the stator 125 and the inner rotor 121 (toward the planetary gear mechanism 113). The cooling fan 165 for cooling the motor is housed and fixed within the fan housing part 124. The fan housing part 124 is a feature that corresponds to the "extending region", and the cooling fan 165 is a feature that corresponds to the "actuating member other than the tool bit" and the "fan" according to this invention.

In this embodiment, the electric current value of the driving motor 111 is monitored. When the amount of heat generation of the driving motor 111 is small, for example, under no load, the cooling fan 165 is stopped, and when the amount of heat generation of the driving motor 111 is large, for example, during operation, the outer rotor 123 is driven to drive the cooling fan 165.

According to this embodiment, independently of driving of the spindle 115 by the inner rotor 121, the cooling fan 165 can be driven by the outer rotor 123. Therefore, regardless of the operational status of the spindle 115 (the screw bit 119), the cooling fan 165 can be constantly driven at the maximum speed. Therefore, the effect of cooling the driving motor 111 can be improved, so that the driving motor 111 can be protected from burnout.

Further, the inner rotor 121 is exclusively used for driving the spindle 115 and not used for driving the cooling fan 165. Accordingly, the output of the inner rotor 121 is improved. Further, when the amount of heat generation of the driving motor 111 is small, the cooling fan 165 can be stopped, so that generation of noise can be lessened.

Further, according to this embodiment, with the construction in which the motor is arranged coaxially with the output shaft or the spindle 115, the inner rotor 121, the stator 125 and the outer rotor 123 can be simultaneously cooled by the one cooling fan 165, and the relatively large cooling fan can be mounted without increasing the size of the machine body. Thus, the cooling effect can be easily obtained.

(Fifth Embodiment of the Invention)

Figure 11:
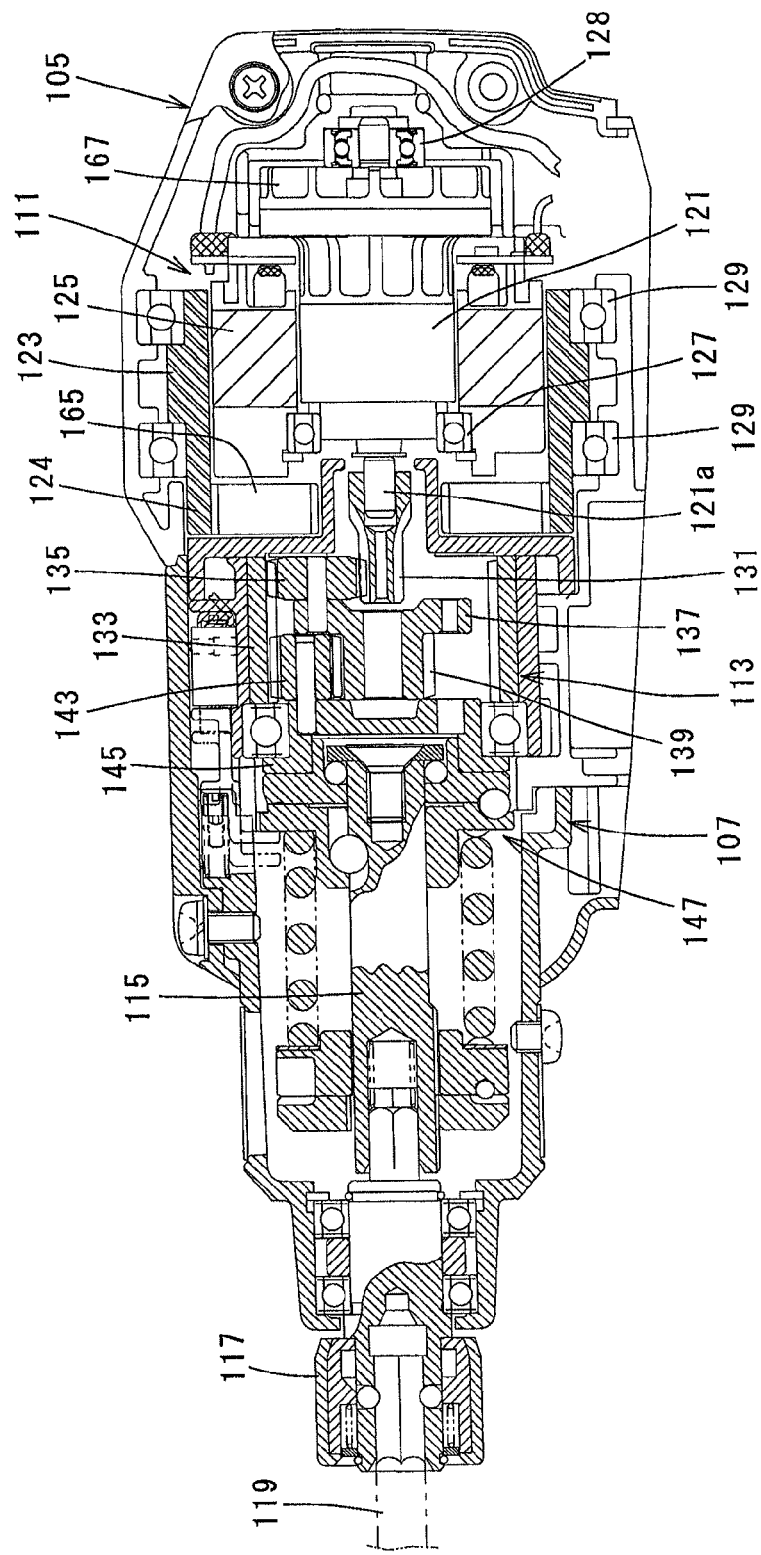
FIG. 11 is a sectional side view schematically showing a screwdriver according to a fifth embodiment of the present invention.
Figure 12:
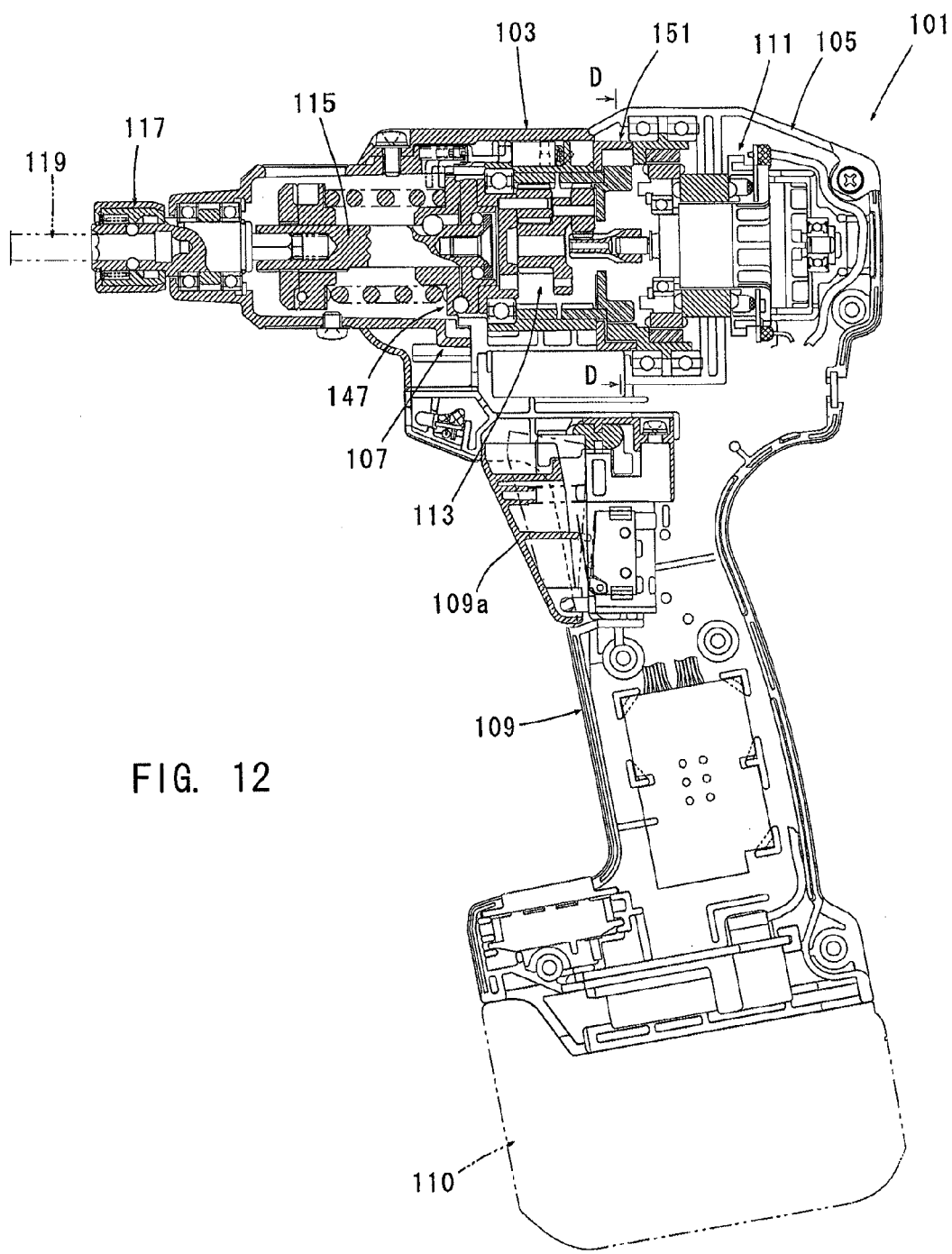
FIG. 12 is a sectional side view schematically showing a screwdriver according to a sixth embodiment of the present invention.

A fifth embodiment of the present invention is now described with reference to FIG. 11. This embodiment is a modification to the fourth embodiment and different from the fourth embodiment in that, in addition to the motor cooling fan 165 mounted to the outer rotor 123, a cooling fan 167 for cooling the motor is mounted to the inner rotor 121. In the other points, this embodiment has the same construction as the above-described fourth embodiment. The cooling fan 167 to be driven by the inner rotor 121 is provided rearward of the rear end surface of the stator 125 on the rear end of the inner rotor 121. Each of the cooling fans 165, 167 is a feature that corresponds to the "actuating member other than the tool bit" and the "fan" according to this invention.

Therefore, according to the fifth embodiment, the motor is cooled by the cooling fan 167 even during normal operation in which the spindle 115 is rotationally driven by driving the inner rotor 121. Thus, the operating time of the outer rotor 123 can be shortened.

Further, the electric current value of the driving motor 111 is monitored. Under high load or other similar conditions in which the motor may easily burn out, the cooling fan 165 can be driven by the outer rotor 123 so that the cooling capacity can be improved. Therefore, this embodiment can be suitably applied to a tightening tool which is used under relatively high-load conditions. Further, the cooling fan 165 which is driven by the outer rotor 123 is used only under high-load conditions, so that the amount of screw tightening operation per charge can be easily ensured.

Further, like in the fourth embodiment, with the construction in which the motor is arranged coaxially with the output shaft or the spindle 115, the relatively large cooling fan can be mounted without increasing the size of the machine body. Thus, the cooling effect can be easily obtained.

In the first to fifth embodiments in which the stator 125 is formed by one member, the driving coil mechanism is described as having the inner rotor driving coil for driving the inner rotor 121 and an outer rotor driving coil for driving the outer rotor 123. In place of this construction, however, it may have a construction in which two kinds of electric current are passed through a common driving coil such that the inner rotor 121 and the outer rotor 123 are individually driven, or specifically, such that one driving coil is used to drive the inner rotor 121 and the outer rotor 123.

(Sixth Embodiment of the Invention)

A sixth embodiment of the present invention is now described with reference to FIGS. 12 to 22. In this embodiment, the stator 125 of the driving motor 111 in the first embodiment is formed by a stator for an outer rotor and a stator for an inner rotor. In the other points, this embodiment has generally the same construction as the above-described first embodiment. Therefore, this embodiment is described with a focus on the driving motor 111 which is different from that of the first embodiment. The entire construction of the screwdriver 101 other than the driving motor 111, and the planetary gear mechanism 113 and the bi-directional one-way clutch 151 which serve as a speed reducing mechanism for transmitting the rotation output of the driving motor 111 to the spindle 115 are given like numerals as in the first embodiment, and they are not described or briefly described.

Figure 13:
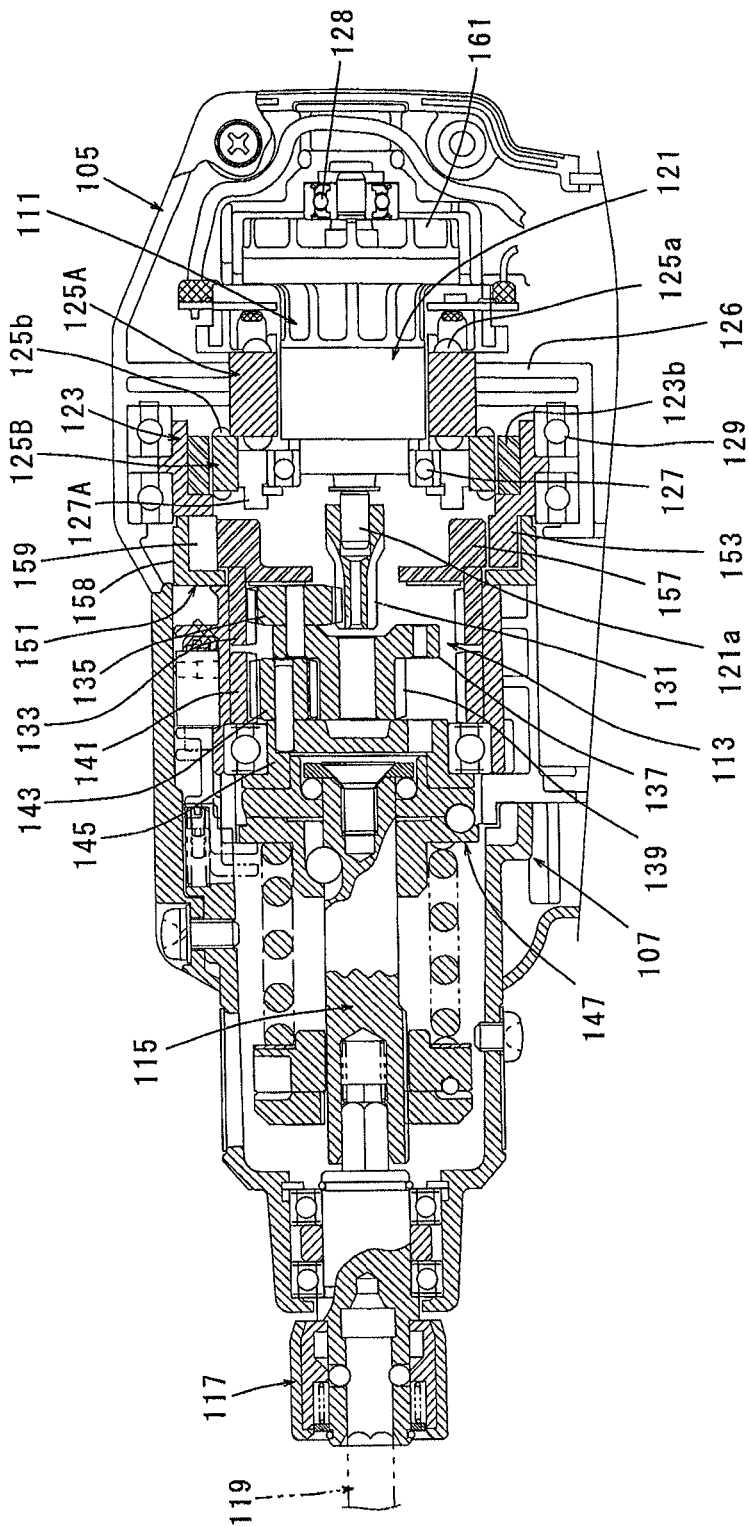
FIG. 13 is an enlarged sectional view of an essential part of the screwdriver.

FIG. 13 shows an essential part of the screwdriver 101. As shown, the driving motor 111 has an inner rotor 121 (first rotor), an outer rotor 123 (second rotor), a stator for the inner rotor (hereinafter referred to as an inner stator) 125A on which an inner-rotor driving coil 125a for driving the inner rotor 121 is wound, and a stator for the outer rotor (hereinafter referred to as an outer stator) 125B on which an outer-rotor driving coil 125b for driving the outer rotor 123 is wound. The driving motor 111 is configured as a dual rotor motor in which the inner rotor 121 and the outer rotor 123 are arranged coaxially inside of the inner stator 125A and outside of the outer stator 125B, respectively. The inner stator 125A and the outer stator 125B are features that correspond to the "first stator" and the "second stator", respectively, according to this invention. Further, the inner-rotor driving coil 125a and the outer-rotor driving coil 125b form the "driving coil mechanism".

As shown in FIGS. 16 to 19, the inner stator 125A and the outer stator 125B are generally doughnut-shaped. The inner stator 125A includes an annular yoke 125A1, a plurality of teeth 125A2 and a plurality of slots. The teeth 125A2 extend radially inward from the inner circumferential surface of the yoke 125A1 and spaced apart from each other, and an inner-rotor driving coil (which is not shown in FIGS. 16 to 19) is wound around the teeth 125A2. The outer stator 125B has a ring-like stator body 125B1, a plurality of teeth 125B2 and a plurality of slots. The teeth 125B2 extend radially outward from the outer circumferential surface of the stator body 125B1 and spaced apart from each other, and an outer-rotor driving coil (which is not shown in FIGS. 16 to 19) is wound around the teeth 125B2.

Figure 20:
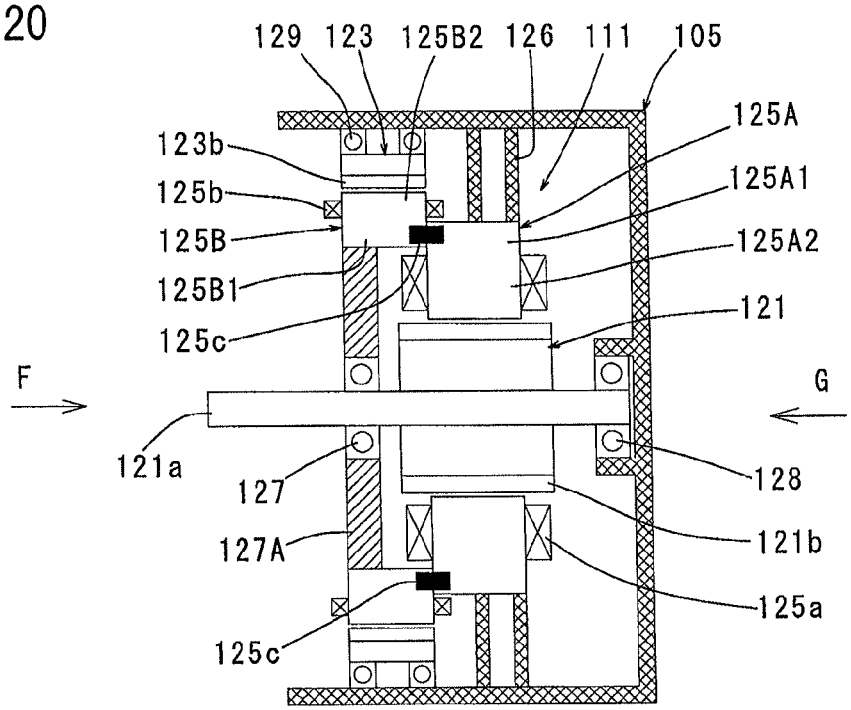
FIG. 20 is a sectional view schematically showing a supporting (holding) structure of the stator in the dual rotor motor according to the sixth embodiment.
Figure 21:
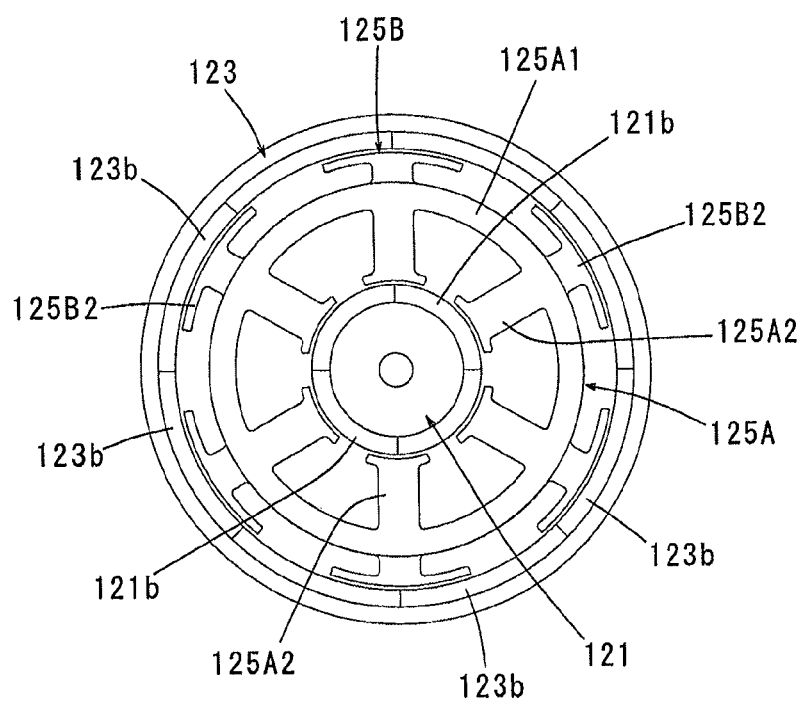
FIG. 21 is a view showing only the motor as viewed from the direction of arrow F in FIG. 20.
Figure 22:
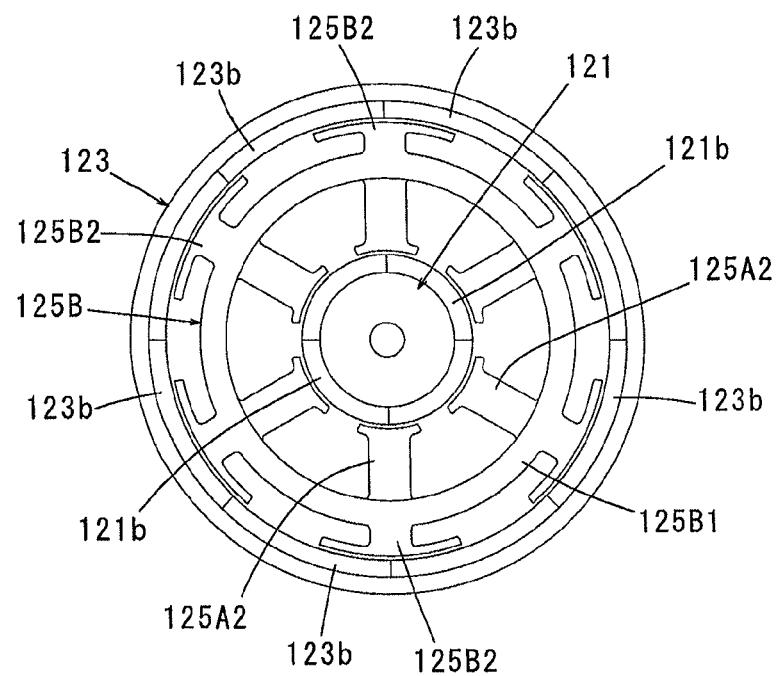
FIG. 22 is a view showing only the motor as viewed from the direction of arrow G in FIG. 20.

In this embodiment, as shown in FIG. 21, the inner rotor 121 having four magnets 121b fixed on its outer circumferential surface and the inner stator 125A having six slots form a four-pole six-slot inner motor. Further, as shown in FIG. 22, the outer rotor 123 having eight magnets 123b fixed on the inner circumferential surface of the outer rotor 123 and the outer stator 125B having eight slots form an eight-pole six-slot outer motor. As shown in FIGS. 13 and 20, the inner motor and the outer motor are arranged at positions displaced from each other in the longitudinal direction within the motor housing 105, or more specifically, such that the outer motor is located forward of the inner motor.

Figure 17:
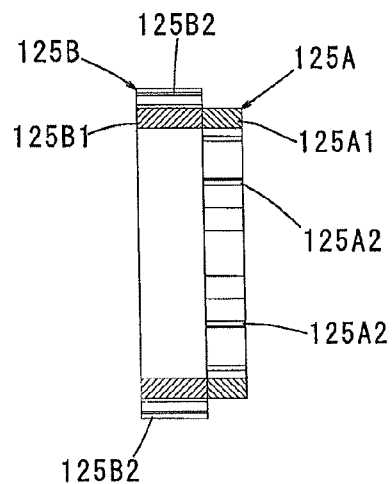
FIG. 17 is a sectional view taken along line E-E in FIG. 16.
Figure 18:
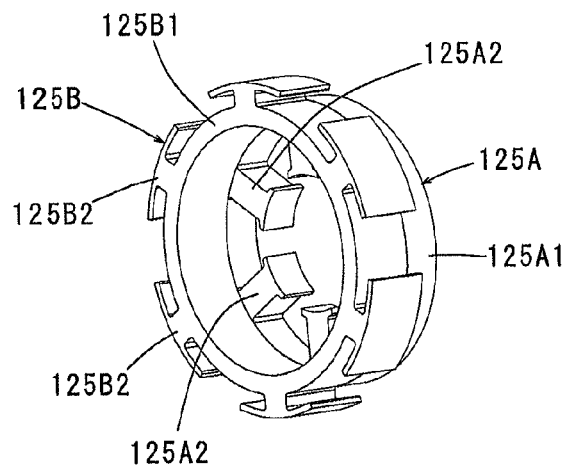
FIG. 18 is a perspective view as viewed from the left in FIG. 16.
Figure 19:
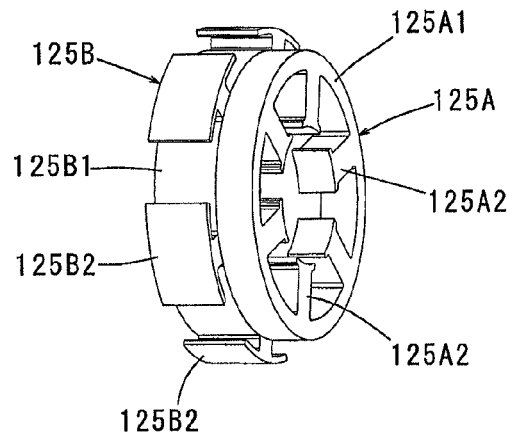
FIG. 19 is a perspective view as viewed from the right in FIG. 16.

The yoke 125A1 of the inner stator 125A and the yoke 125B1 of the outer stator 125B have generally the same inner and outer diameters, and a rear surface of the yoke 125B1 of the outer stator 125B and a front surface of the yoke 125A1 of the inner stator 125A are aligned and connected together (see FIGS. 17 and 20). Specifically, the yokes 125A1, 125B1 of the inner and outer stators 125A, 125B are configured to be aligned in contact with each other and connected together by a connecting member in the form of a plurality of pins 125c (see FIG. 20) arranged at predetermined intervals in the circumferential direction. Other connecting methods may be provided to connect the inner and outer stators 125A, 125B in place of the above-described method using the pins 125c. For example, mechanical connection using a plurality of screws or the like, connection via a resin layer by resin molding, or connection using an adhesive can be used.

As shown in FIGS. 13 and 20, in the motor housing 105 in which the inner motor and the outer motor are set, the inner and outer stators 125A, 125B are arranged at positions displaced from each other in the longitudinal direction and connected together as described above, so that an annular space is created between the outer circumferential region of the yoke 125A1 of the inner stator 125A and the inner wall surface of the motor housing 105. In this embodiment, this space is utilized to provide a supporting member 126 via which the motor housing 105 can support the outer circumferential region of the yoke 125A1 from outside. The supporting member 126 is provided, for example, as an annular member formed separately from the motor housing 105, or as an annular member integrally extending inward from the inner wall of the motor housing 105. The outer and inner peripheries of the supporting member 126 are fixed to the motor housing 105 and the yoke 125A1 of the inner stator 125A, respectively.

The inner rotor 121 is disposed inside of the inner stator 125A. The inner rotor 121 is rotatably supported at the front via a bearing 127 with respect to a bearing housing 127A which is disposed inside of the outer stator 125B, and it is rotatably supported at the rear via a bearing 128 with respect to the motor housing 105. The outer rotor 123 is generally cylindrical and disposed outside of the outer stator 125B. The outer rotor 123 is rotatably supported on its outer periphery via front and rear bearings 128 with respect to the motor housing 105. The inner rotor 121 and the outer rotor 123 are independently and individually driven and stopped. Further, predetermined air gaps are provided between the inner rotor 121 and the inner stator 125A and between the outer rotor 123 and the outer stator 125B.

As shown in FIG. 13, the planetary gear mechanism 113 is disposed in front of the driving motor 111 having the above-described construction. The rotation output of the driving motor 111 is reduced in speed by the planetary gear mechanism 113 and transmitted to the spindle 115 and then to the screw bit 119 which is held by the spindle 115 via the bit holder 117. The planetary gear mechanism 113 is a feature that corresponds to the "speed reducing mechanism" according to the present invention. Further, the planetary gear mechanism 113 and the overload clutch 147 disposed between the planetary gear mechanism 113 and the spindle 115 have the same construction and effect as the above-described first embodiment. Therefore, their description is omitted.

Figure 14:
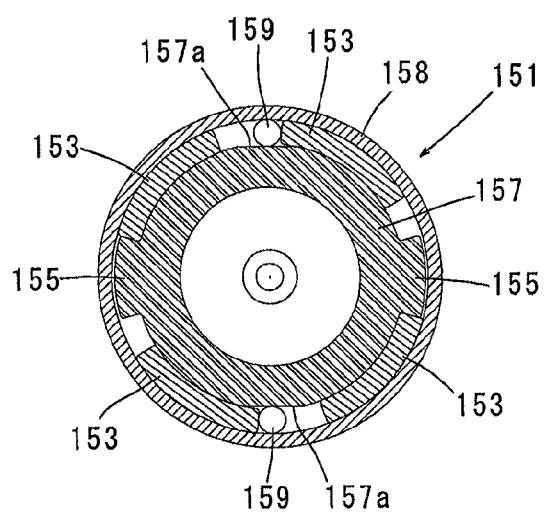
FIG. 14 is a sectional view of a bi-directional one-way clutch, taken along line D-D in FIG. 12, in a lock released state.
Figure 15:
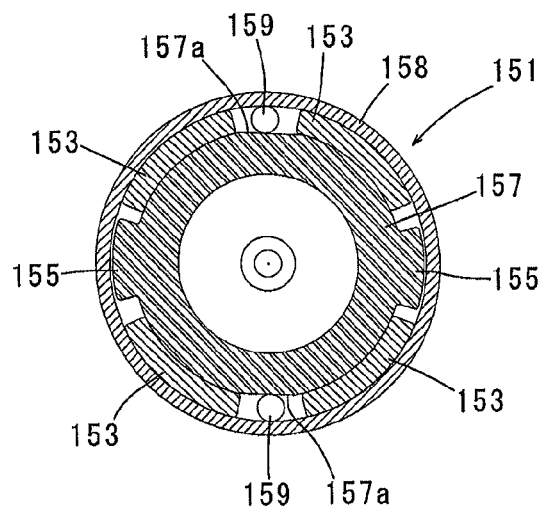
FIG. 15 is also a sectional view of the bi-directional one-way clutch, taken along line D-D in FIG. 12, in a locked state.
Figure 16:
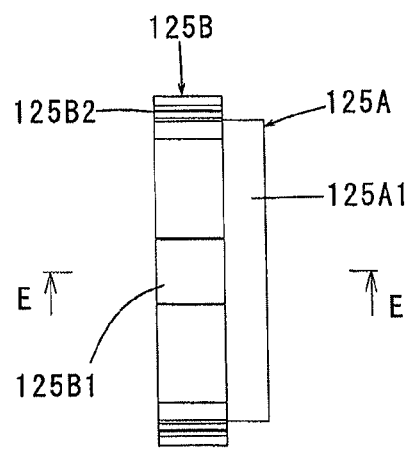
FIG. 16 is an external view of a stator of a dual rotor motor according to the sixth embodiment.

The outer rotor 123 is connected to the first internal gear 133 of the planetary gear mechanism 113 via the bi-directional one-way clutch 151. The bi-directional one-way clutch 151 is a feature that corresponds to the "clutch" according to this invention. As shown in FIGS. 14 and 15, the bi-directional one-way clutch 151 is provided as a machine element which can transmit torque of the outer rotor 123 on the input side (driving side) to the first internal gear 133 (the spindle 115) on the output side (driven side) both in the clockwise and counterclockwise directions. Moreover, when torque is about to be inputted reversely from the output side to the input side by load applied to the output side, the bi-directional one-way clutch 151 is locked to interrupt transmission of torque from the output side to the input side both in the clockwise and counterclockwise directions. The bi-directional one-way clutch 151 has the same construction and effect as the above-described first embodiment. Therefore, their description is omitted.

In this embodiment, when the first internal gear 133 is locked and the inner rotor 121 of the driving motor 111 is electrically driven, the spindle 115 is caused to rotate at a certain reduction ratio predetermined in the planetary gear mechanism 113. In this state, when the outer rotor 123 is rotated in the same direction as the inner rotor 121, the first internal gear 133 serving as a reaction force receiving member rotates in the same direction as the first sun gear 131. As a result, the number of revolutions of the first planetary gears 135 around the first sun gear 131 increases by the number of rotations of the first internal gear 133, so that the rotation speed of the spindle 115 increases. On the other hand, when the outer rotor 123 is rotated in the opposite direction, the number of revolutions of the first planetary gears 135 decreases by the number of rotations of the first internal gear 133, so that the rotation speed of the spindle 115 decreases.

In this manner, according to this embodiment, the outer rotor 123 can be switched between the stopped state and the driven state in which it is driven in the same direction as the inner rotor 121 or in the opposite direction, while the inner rotor 121 is constantly and continuously driven. By this switching, the revolution speed of the first planetary gears 135 (the rotation speed of the first carrier 137) can be changed so that the speed reduction ratio of the planetary gear mechanism 113 can be changed. Specifically, the output torque and the rotation speed to be outputted to the spindle 115 can be changed by changing the speed reduction ratio of the planetary gear mechanism 113. Further, the speed reduction ratio is changed according to load on the spindle 115 such as the driving current, torque, rotation speed and temperature of the driving motor 111. The speed reduction ratios set by switching the outer rotor 123 to the stopped state and the driven state while the inner rotor 121 is constantly driven are features that correspond to the "first and second speed reduction ratios", respectively, according to this embodiment.

In this embodiment, the inner rotor 121 and the inner stator 125A form the inner motor and the outer rotor 123 and the outer stator 125B form the outer motor. The inner motor and the outer motor are arranged at positions displaced from each other in the longitudinal direction within the housing 105. Therefore, a space is created between the outer circumferential region of the inner motor (or the inner stator 125A) and the inner wall surface of the motor housing 105. This space is utilized to provide a supporting member 126 via which the motor housing 105 can support (hold) the outer circumferential region of the inner stator 125A of the inner motor. Therefore, for example, compared with a structure of holding an end surface (side) of the stator in the longitudinal direction, the stator can be firmly supported with a simpler structure.

Further, in this embodiment, the yokes 125A1, 125B1 of the inner and outer stators 125A, 125B are aligned in contact with each other in the longitudinal direction and connected together by the pins 125c in the aligned region. With this construction, the inner and outer stators 125A, 125B can be connected together in a rational manner.

According to this embodiment, not only the above-described effects but the same effects as the above-described first embodiment can be obtained, which are not described in order to avoid redundant description.

Next, a modification to the driving motor 111 of the sixth embodiment is described with reference to FIG. 23. The driving motor 111 of this modification has an inner rotor 121 (first rotor), an outer rotor 123 (second rotor), a stator for the inner rotor (hereinafter referred to as an inner stator) 125A on which an inner-rotor driving coil 125a for driving the inner rotor 121 is wound, and a stator for the outer rotor (hereinafter referred to as an outer stator) 125B on which an outer-rotor driving coil 125b for driving the outer rotor 123 is wound. The inner rotor 121 is disposed inside of the inner stator 125A, and the outer rotor 123 is disposed in front of the outer stator 125B to face each other. The driving motor 111 is configured as a dual rotor motor in which the inner rotor 121 and the outer rotor 123 are arranged coaxially.

Specifically, in the dual rotor motor of this modification, the inner motor having the inner rotor 121 and the inner stator 125A is configured as a radial gap motor in which the inner rotor 121 and the inner stator 125A are opposed to each other in the radial direction, while the outer motor having the outer rotor 123 and the outer stator 125B is configured as an axial gap motor in which the outer rotor 123 and the outer stator 125B are opposed to each other in the longitudinal direction. In this point, this modification is different from the above-described sixth embodiment.

Figure 23:
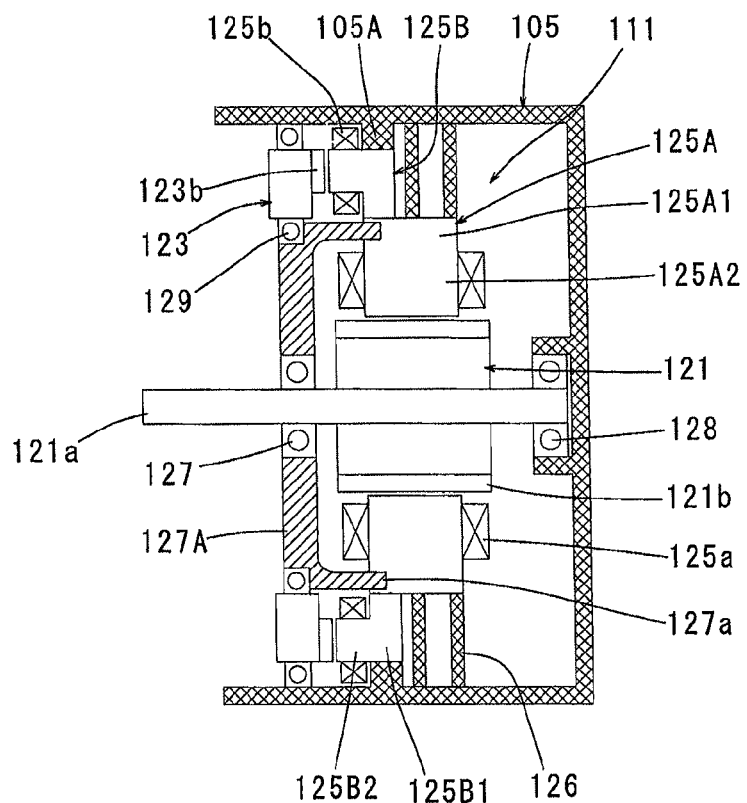
FIG. 23 is a sectional view schematically showing a modification to the structure of the dual rotor motor according to the sixth embodiment.

As shown in FIG. 23, the inner motor having the inner rotor 121 and the inner stator 125A and the outer motor are arranged at positions displaced from each other in the longitudinal direction, or more specifically, such that the outer motor is located forward of the inner motor. An outer circumferential surface of the front end of the yoke 125A1 of the inner stator 125A in the inner motor and an inner circumferential surface of the yoke 125B1 of the outer stator 125B in the outer motor are configured to be aligned in contact with each other and connected together in the aligned region, for example, via a resin layer by resin molding, or by using an adhesive.

In this modification, the outer motor is configured as an axial gap motor in which the outer rotor 123 and the outer stator 125B are opposed to each other in the longitudinal direction, so that a space is created between the outer circumferential surface of the outer stator 125B and the inner wall surface of the motor housing 105. This space is utilized, for example, to provide an annular supporting part 105A which is integrally formed with the inner wall of the motor housing 105 (or an annular member which is formed separately from the motor housing 105) and supports the outer stator 125B from outside. Specifically, according to this modification, the structure of supporting the outer circumferential region of the outer stator 125B from outside by the supporting part 105A of the motor housing 105 is provided in addition to the structure of supporting the outer circumferential region of the inner stator 125A of the inner motor from outside by the motor housing 105 via the supporting member 126. With this construction, the stator can be more firmly supported.

Further, according to this modification, the outer stator 125B of the outer motor is disposed outside of the inner stator 125A. Therefore, it can be constructed as shown in the drawing such that part 127a of the bearing housing 127A extends to the yoke 125A1 of the inner stator 125A and supports the front surface of the yoke 125A1. With this construction, the stator can be further more firmly supported.

(Seventh Embodiment of the Invention)

Figure 24:
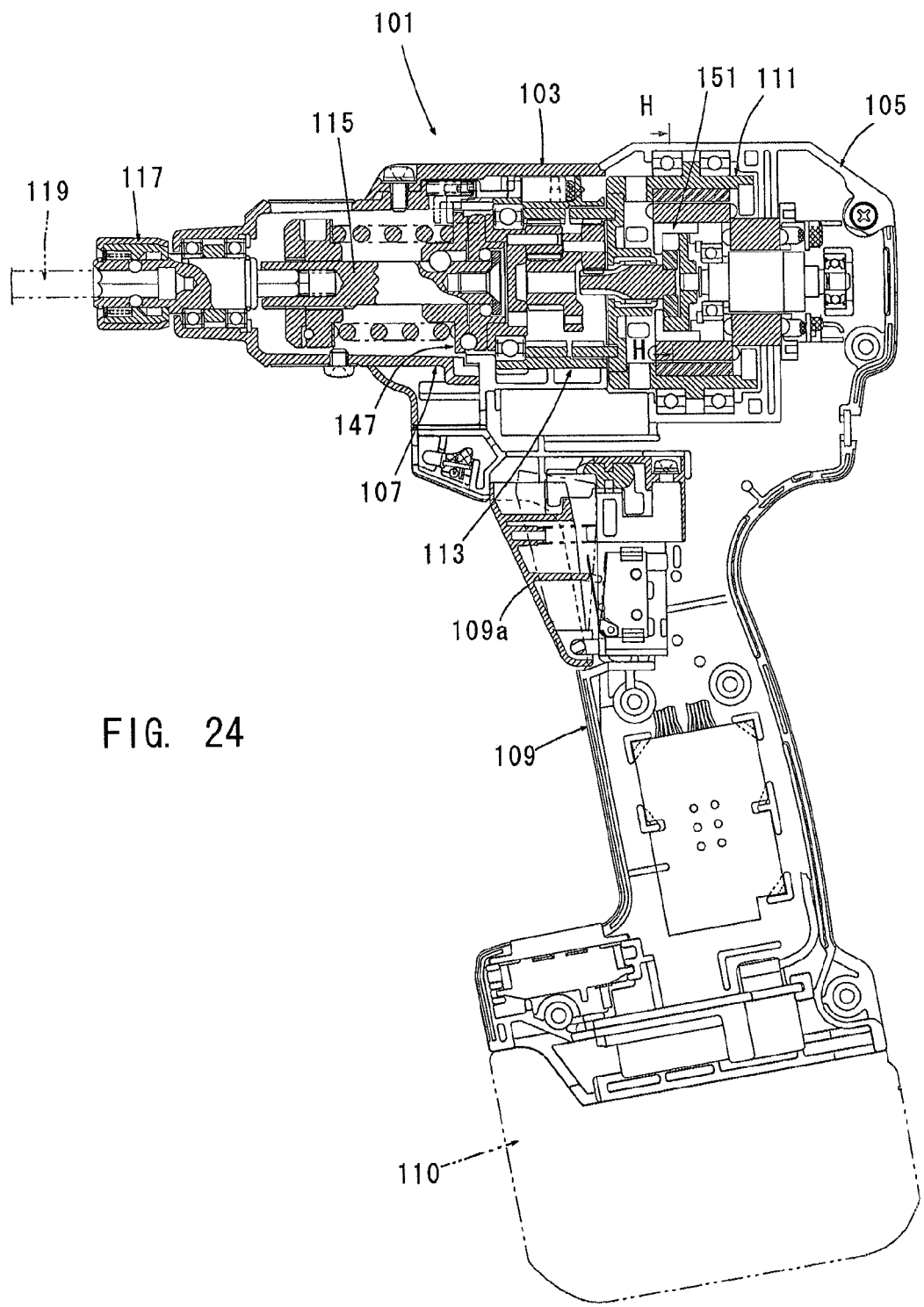
FIG. 24 is a sectional side view schematically showing a screwdriver according to a seventh embodiment of the present invention.
Figure 25:
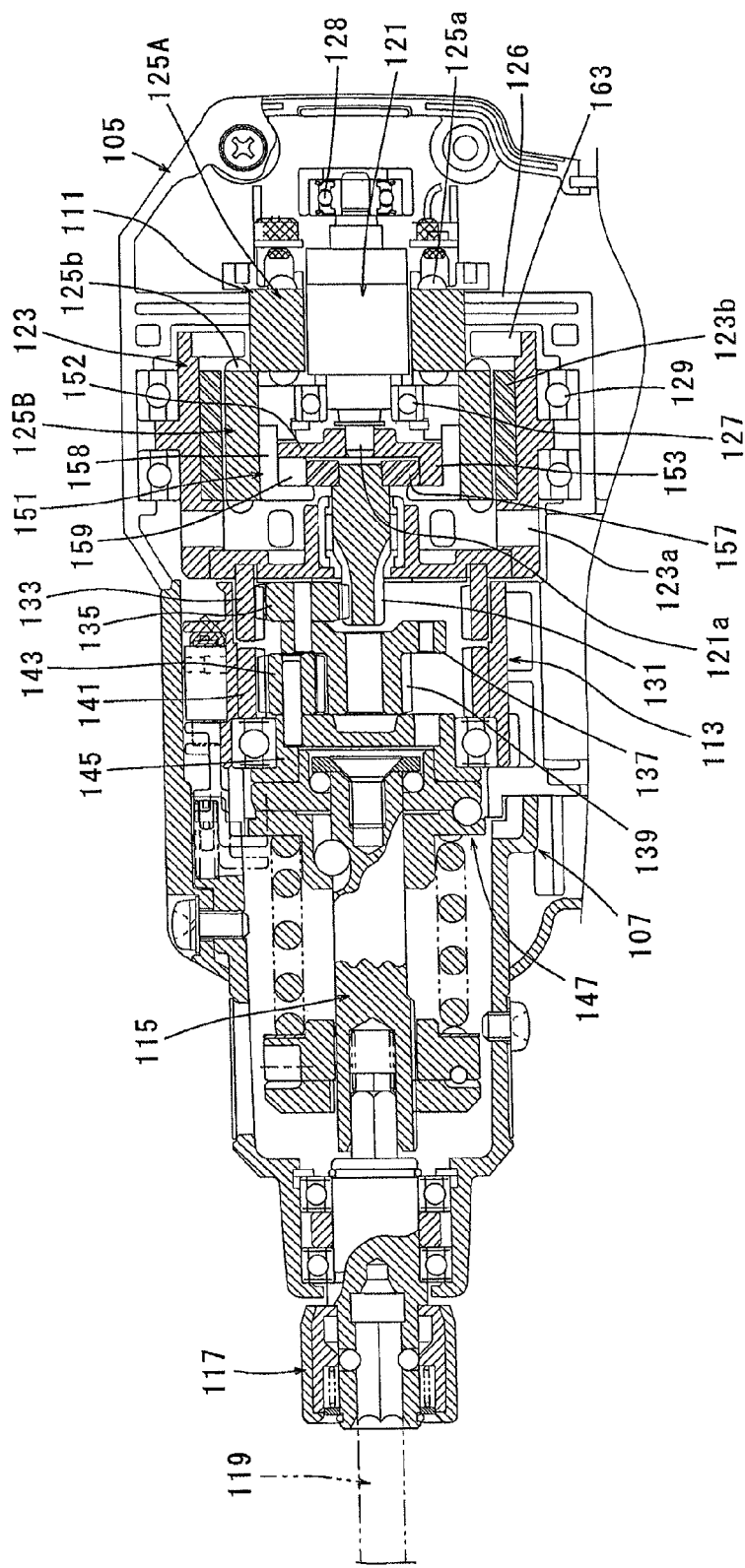
FIG. 25 is an enlarged sectional view of an essential part of the screwdriver.

A seventh embodiment of the present invention is now described with reference to FIGS. 24 to 27. In this embodiment, as shown in FIGS. 24 and 25, the first internal gear 133 is constantly driven by the outer rotor 123, and the first sun gear 131 can be driven and stopped by the inner rotor 121. To this end, the outer rotor 123 is directly connected to the first internal gear 133, and the bi-directional one-way clutch 151 is disposed between the inner rotor shaft 121a of the inner rotor 121 and the first sun gear 131. In the other points, this embodiment has the same construction as the above-described sixth embodiment, including the structure of supporting the outer circumferential region of the inner stator 125A by the supporting member 126. Therefore, components in this embodiment which are substantially identical to those in the sixth embodiment are given like numerals as in the sixth embodiment.

Figure 26:
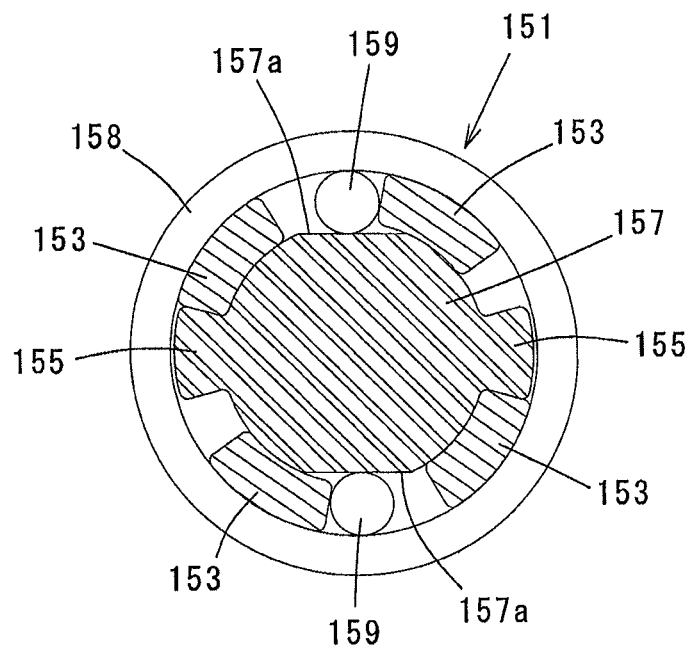
FIG. 26 is a sectional view of a bi-directional one-way clutch, taken along line H-H in FIG. 24, in a lock released state.
Figure 27:
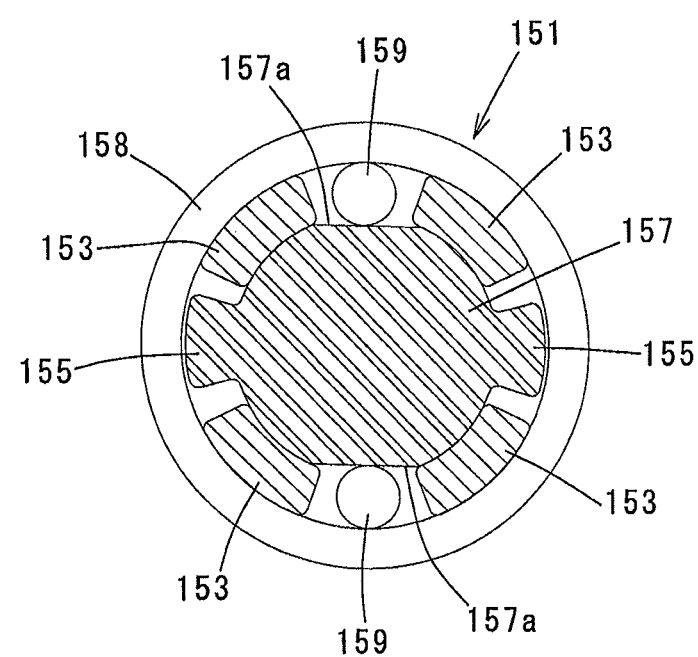
FIG. 27 is also a sectional view of the bi-directional one-way clutch, taken along line H-H in FIG. 24, in a locked state.

As shown in FIGS. 26 and 27, the bi-directional one-way clutch 151 has basically the same construction and function as that in the sixth embodiment (and thus the first embodiment). Due to arrangement of the bi-directional one-way clutch 151 between the inner rotor shaft 121a and the first sun gear 131, however, the fixed outer ring 158 which forms the outer shell of the bi-directional one-way clutch 151 is connected to the inside of the outer stator 125B in front of the inner stator 125A of the driving motor 111 and has a generally cup-like shape having a circular central opening through which the first sun gear 131 is loosely inserted. Further, four power transmitting parts 153 are disposed at predetermined intervals in the circumferential direction and integrally formed with a disc-like power transmitting member 152. The power transmitting member 152 is connected to the inner rotor shaft 121a and rotates together with the inner rotor shaft 121a. The power receiving member 157 having the power receiving parts 155 is connected to the first sun gear 131 and rotates together with the first sun gear 131. In the other points, the bi-directional one-way clutch 151 has the same construction as that in the sixth embodiment (and thus the first embodiment).

Therefore, when the inner rotor 121 is driven, as shown in FIG. 26, the lock pin 159 is pushed by the front end surface of the power transmitting part 153 in the rotation direction, so that each of the lock pins 159 is not wedged into a wedge-shaped space between the outer surface of the power receiving member 157 and the inner surface of the fixed outer ring 158. Therefore, the power transmitting part 153 comes into contact with the power receiving part 155 in the circumferential direction and transmits torque to the first sun gear 131. When torque is inputted from the output side to the input side, or more specifically when load is applied onto the first sun gear 131 (the spindle 115) side and the power receiving member 157 is about to rotate with respect the power transmitting member 152 in the state shown in FIG. 27, the lock pins 159 are wedged into the wedge-shaped spaces between the outer surface of the power receiving member 157 and the inner surface of the fixed outer ring 158, so that the power receiving member 157 is locked to the fixed outer ring 158.

Specifically, when the inner rotor 121 on the input (driving) side is driven, the bi-directional one-way clutch 151 can transmit torque of the inner rotor 121 to the first sun gear 131 (the spindle 115) on the output (driven) side both in the clockwise and counterclockwise directions. Moreover, when torque is about to be inputted reversely from the output side to the input side by load applied to the output side, the bi-directional one-way clutch 151 locks the first sun gear 131 and interrupts transmission of torque from the output side to the input side both in the clockwise and counterclockwise directions.

In this embodiment, the first internal gear 133 is constantly driven by the outer rotor 123 of the driving motor 111, and the first sun gear 131 can be driven and stopped by the inner rotor 121. Therefore, while the spindle 115 (the screw bit 119) is driven by driving the outer rotor 123, the inner rotor 123 is intermittently driven, or repeatedly alternates between driving and stopping. In this manner, the screw bit 119 which is being driven at an output torque outputted by the outer rotor 123 intermittently gains the output torque outputted by the inner rotor 121. Thus, according to this embodiment, torque for driving the screw bit 119 can be intermittently changed.

Thus, according to this embodiment, by intermittently driving the inner rotor 121, the operation of temporarily increasing the output torque to be outputted to the screw bit 119 and then immediately returning it to its initial state can be repeated. Therefore, for example, when load (tightening torque) increases upon seating of the screw on the workpiece during screw tightening operation, torque ripple can be caused by intermittently driving the inner rotor 121, and the screw tightening operation can be performed at a higher tightening torque than a normal tightening torque.

Further, in this embodiment, the first sun gear 131 receives a reaction force when the screw bit 119 is rotationally driven by the outer rotor 121. Therefore, the inner rotor 121 needs to generate higher torque than the outer rotor 123 in order to cause torque ripple by intermittent driving of the inner rotor 123. During the time when torque ripple is not caused, the first sun gear 131 needs to be held in the locked state by stopping driving of the inner rotor 121. If the first sun gear 131 is held in the locked state only by torque of the inner rotor 121, motor burnout may be caused. According to this embodiment, however, the bi-directional one-way clutch 151 provided between the inner rotor 121 and the first sun gear 131 can interrupt reverse input of power from the first sun gear 131 on the driven side to the inner rotor 121 on the input side and hold the first internal gear 133 in the locked state. Thus, the outer rotor 123 can be protected from burnout.

Further, in this embodiment, a cooling fan 163 for cooling the motor is provided on the outer rotor 123 which is constantly driven. The cooling fan 163 is provided on the inner circumferential surface of an axial end (rear end) of the outer rotor 123 on the opposite side from the first internal gear 133. The cooling fan 163 serves to cool the driving motor 111 by taking outside air into the space of the motor housing 105 through an inlet formed in the rear end of the motor housing 105 and leading it forward in the longitudinal direction. The air taken into the motor housing space cools the driving motor 111 by flowing into the motor through gaps between the outer stator 125B and the outer rotor 123 and between the inner stator 125A and the inner rotor 121. Thereafter, the air flows out to the outside of the motor through a radially extending communication hole 123a (see FIG. 25) formed through a front end region of the outer rotor 123. The air then further passes between the motor housing 105 and the gear housing 107 and is discharged to the outside through an outlet. In this case, preferably, the supporting member 126 for supporting the inner stator 125A may be provided with air holes which extend through it in the longitudinal direction such that the cooling air can be led to the gap between the outer stator 125B and the outer rotor 123.

According to this embodiment, not only the above-described effects but the same effects as the first embodiment can be obtained, which are not described in order to avoid redundant description.

(Eighth Embodiment of the Invention)

Figure 28:
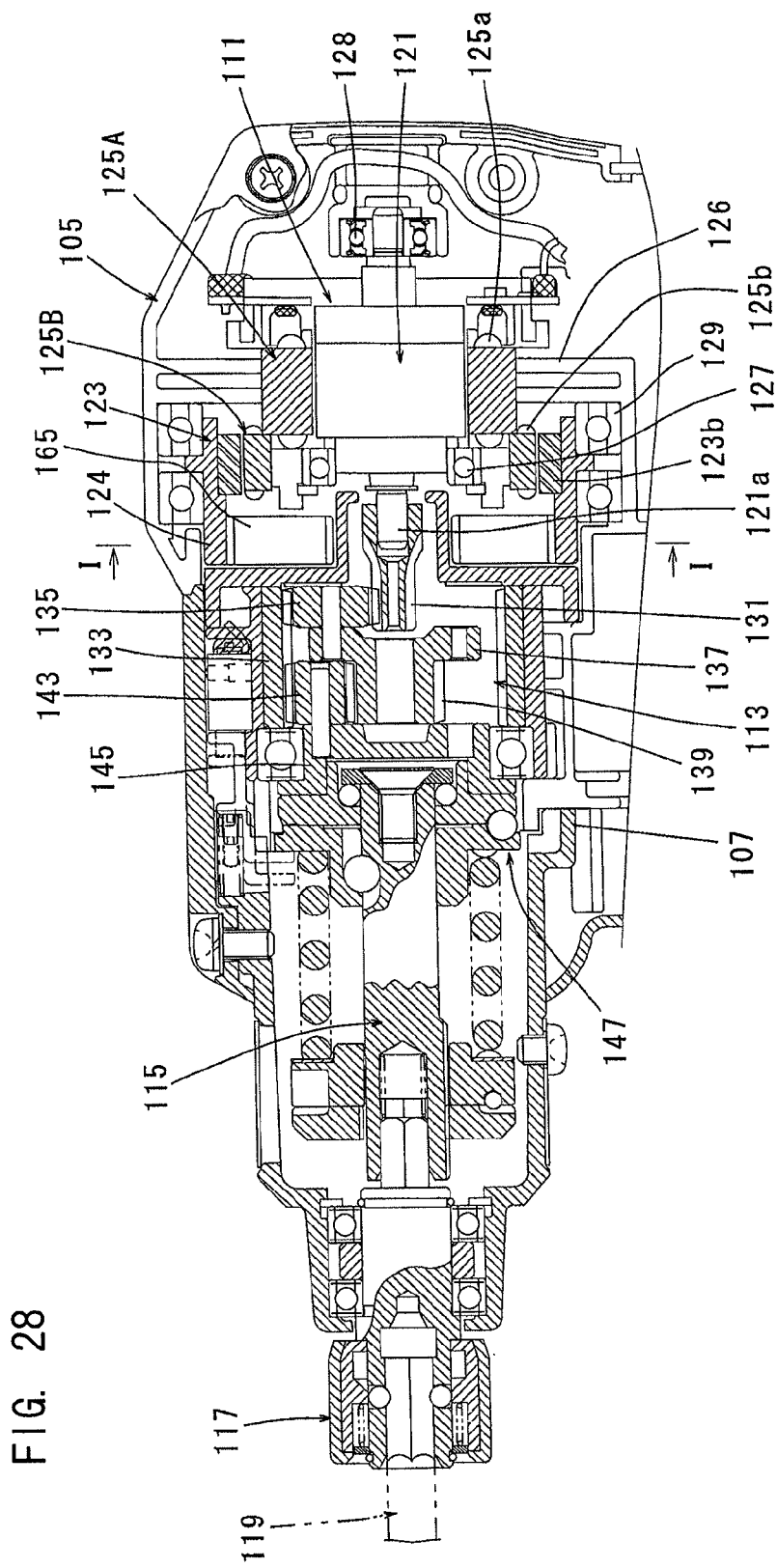
FIG. 28 is a sectional side view schematically showing a screwdriver according to an eighth embodiment of the present invention.
Figure 29:
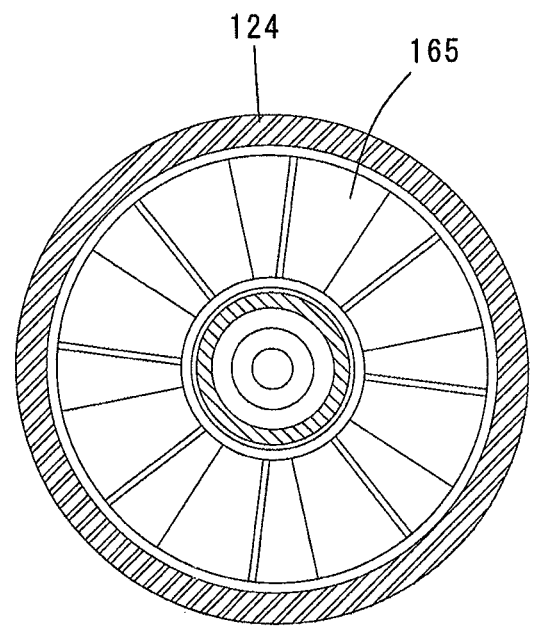
FIG. 29 is a sectional view of a cooling fan, taken along line I-I in FIG. 28.

An eighth embodiment of the present invention is now described with reference to FIGS. 28 and 29. In this embodiment, in the battery-powered screwdriver 101, the first sun gear 131 of the planetary gear mechanism 113 is driven by the inner rotor 121 to rotationally drive the spindle 115 (the screw bit 119) via the planetary gear mechanism 113, while a cooling fan 165 is driven by the outer rotor 123. In the other points, this embodiment has generally the same construction as the sixth embodiment, except that the bi-directional one-way clutch 151 is not provided and the first and second internal gears 133, 141 are formed in one piece and fixed to the gear housing 107 side in the planetary gear mechanism 113 and further that the outer circumferential region of the inner stator 125A is supported by the supporting member 126. Therefore, components in this embodiment which are substantially identical to those in the sixth embodiment are given like numerals as in the sixth embodiment, and they are not described.

A cylindrical fan housing part 124 is formed on one (front) end of the outer rotor 123 in the longitudinal direction and extends forward of the front ends of the outer stator 125B and the inner rotor 121 (toward the planetary gear mechanism 113). The cooling fan 165 for cooling the motor is housed and fixed within the fan housing part 124. The fan housing part 124 is a feature that corresponds to the "extending region", and the cooling fan 165 is a feature that corresponds to the "actuating member other than the tool bit" and the "fan" according to this invention.

In this embodiment, the electric current value of the driving motor 111 is monitored. When the amount of heat generation of the driving motor 111 is small, for example, under no load, the cooling fan 165 is stopped, and when the amount of heat generation of the driving motor 111 is large, for example, during operation, the outer rotor 123 is driven to drive the cooling fan 165.

According to this embodiment, independently of driving of the spindle 115 by the inner rotor 121, the cooling fan 165 can be driven by the outer rotor 123. Therefore, regardless of the operational status of the spindle 115 (the screw bit 119), the cooling fan 165 can be constantly driven at the maximum speed. Therefore, the effect of cooling the driving motor 111 can be improved, so that the driving motor 111 can be protected from burnout.

Further, the inner rotor 121 is exclusively used for driving the spindle 115 and not used for driving the cooling fan 165. Accordingly, the output of the inner rotor 121 is improved. Further, when the amount of heat generation of the driving motor 111 is small, the cooling fan 165 can be stopped, so that generation of noise can be lessened.

Further, according to this embodiment, with the construction in which the motor is arranged coaxially with the output shaft or the spindle 115, the inner rotor 121, the inner and outer stators 125A, 125B and the outer rotor 123 can be simultaneously cooled by the one cooling fan 165, and the relatively large cooling fan can be mounted without increasing the size of the machine body. Thus, the cooling effect can be easily obtained.

(Ninth Embodiment of the Invention)

Figure 30:
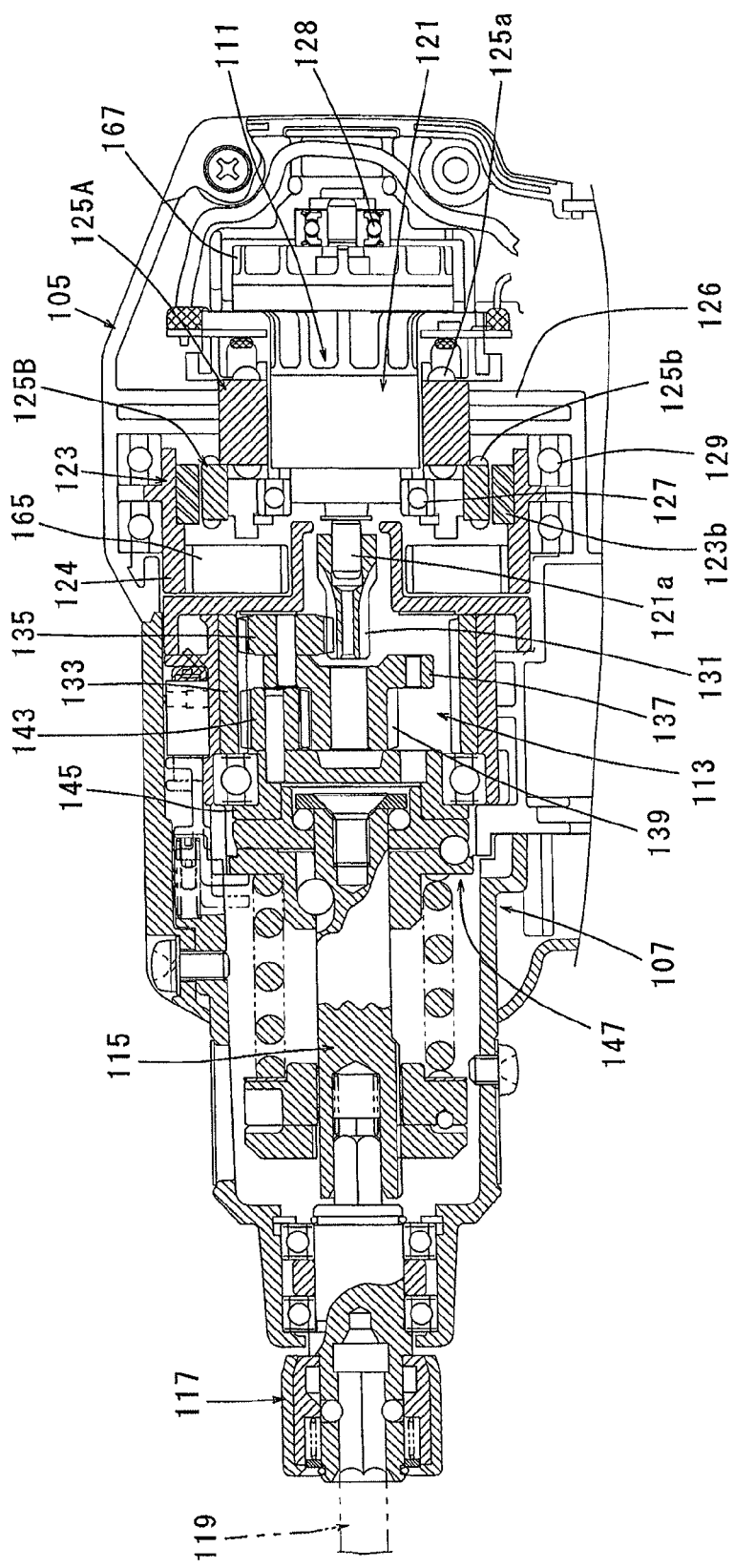
FIG. 30 is a sectional side view schematically showing a screwdriver according to a ninth embodiment of the present invention.

A ninth embodiment of the present invention is now described with reference to FIG. 30. This embodiment is a modification to the eighth embodiment and different from the eighth embodiment in that, in addition to the motor cooling fan 165 mounted to the outer rotor 123, a cooling fan 167 for cooling the motor is mounted to the inner rotor 121. In the other points, this embodiment has the same construction as the above-described eighth embodiment. The cooling fan 167 to be driven by the inner rotor 121 is provided rearward of the rear end surface of the inner stator 125A on the rear end of the inner rotor 121. Each of the cooling fans 165, 167 is a feature that corresponds to the "actuating member other than the tool bit" and the "fan" according to this invention.

Therefore, according to the ninth embodiment, the motor is cooled by the cooling fan 167 even during normal operation in which the spindle 115 is rotationally driven by driving the inner rotor 121. Thus, the operating time of the outer rotor 123 can be shortened.

Further, the electric current value of the driving motor 111 is monitored. Under high load or other similar conditions in which the motor may easily burn out, the cooling fan 165 can be driven by the outer rotor 123 so that the cooling capacity can be improved. Therefore, this embodiment can be suitably applied to a tightening tool which is used under relatively high-load conditions. Further, the cooling fan 165 which is driven by the outer rotor 123 is used only under high-load conditions, so that the amount of screw tightening operation per charge can be easily ensured.

Further, like in the fourth embodiment, with the construction in which the motor is arranged coaxially with the output shaft or the spindle 115, the relatively large cooling fan can be mounted without increasing the size of the machine body. Thus, the cooling effect can be easily obtained.

Further, it can be constructed such that a dust collecting fan, which is not shown, is driven by one or both of the inner rotor 121 and the outer rotor 123. For example, in some cases, a dust collecting device is provided to collect dust which is generated during drilling operation on a workpiece with a drill bit coupled to the spindle 115. The dust collecting fan is provided as a suction force generating means for sucking dust generated by the drilling operation. Therefore, by provision of the construction in which the suction force generating means in the form of the dust collecting fan is driven by one or both of the inner rotor 121 and the outer rotor 123, the power tool with a dust collecting device can be rationally provided.

In the above-described embodiments, the screwdriver is explained as a representative example of the power tool, but the present invention may be applied not only to a fastening tool for fastening screws or the like, but to a drill for drilling operation, a hammer and a hammer drill for chipping operation and drilling operation, and a circular saw and an electric cutter for cutting operation in wood or metal working.

DESCRIPTION OF NUMERALS 101 battery-powered screwdriver (power tool)
103 body (tool body)
105 motor housing
105A supporting part
107 gear housing
109 handgrip
109a trigger
110 battery pack
111 driving motor (motor, dual rotor motor)
113 planetary gear mechanism (speed reducing mechanism)
115 spindle (output shaft)
117 bit holder
119 screw bit (tool bit)
121 inner rotor
121a inner rotor shaft
121b magnet
123 outer rotor
123a communication hole
123b magnet
124 fan housing part
125 stator
125A inner rotor stator (first stator)
125A1 yoke
125A2 teeth
125a inner-rotor driving coil
125B outer rotor stator (second stator)
125B1 yoke
125B2 teeth
125b outer-rotor driving coil
125c pin (connecting member)
126 supporting member
127, 128, 129 bearing
127A bearing housing
127a part
131 first sun gear
133 first internal gear
135 first planetary gear
137 first carrier
139 second sun gear
141 second internal gear
143 second planetary gear
145 second carrier
147 overload clutch
151 bi-directional one-way clutch
152 power transmitting member
153 power transmitting part
155 power receiving part
157 power receiving member
157a planar region
158 fixed outer ring
159 lock pin
161, 163, 165, 167 cooling fan

The invention claimed is:

1. A power tool which performs a predetermined operation on a workpiece with a tool bit driven by a motor, wherein:
    the motor comprises an inner rotor, an outer rotor and a stator having a driving coil mechanism and is configured as a dual rotor motor in which the inner rotor and the outer rotor are coaxially arranged,
    the tool bit is driven by using one of the inner rotor and the outer rotor, and a rotatable fan is driven by using the other rotor, and
    the inner and outer rotors both provide a drive toward the tool bit.

2. The power tool as defined in claim 1, wherein the stator comprises a single member.

3. The power tool as defined in claim 2, wherein the driving coil mechanism includes an inner rotor driving coil for driving the inner rotor and an outer rotor driving coil for driving the outer rotor.

4. The power tool as defined in claim 2, wherein the driving coil mechanism comprises one driving coil for driving both the inner rotor and the outer rotor.

5. The power tool as defined in claim 1, wherein the stator includes a first stator having an inner rotor driving coil for driving the inner rotor and a second stator having an outer rotor driving coil for driving the outer rotor.

6. The power tool as defined in claim 5, comprising a housing for housing the dual rotor motor, wherein the inner motor includes the inner rotor and the first stator and the outer motor includes the outer rotor and the second stator, and wherein the inner motor and the outer motor are arranged in the housing at positions displaced from each other in the longitudinal direction, and a space is formed between an outer circumferential region of the inner motor and the housing.

7. The power tool as defined in claim 6, wherein the outer circumferential region of the first stator of the inner motor is fixedly supported with respect to the housing directly or via a supporting member in the space.

8. The power tool as defined in claim 6, wherein the first and second stators are partly aligned in contact with each other in a radial direction transverse to the longitudinal direction and connected together in the aligned region.

9. The power tool as defined in claim 8, wherein the first and second stators are connected together by a pin in the aligned region.

10. The power tool as defined in claim 8, wherein the first and second stators are connected together by a resin layer in the aligned region.

11. The power tool as defined in claim 6, wherein the outer motor is configured as an axial gap motor in which the outer rotor and the second stator are opposed to each other in the longitudinal direction.

12. The power tool as defined in claim 11, wherein the first and second stators are partly aligned in the longitudinal direction and connected together in the aligned region.

13. The power tool as defined in claim 12, wherein the outer circumferential region of the second stator of the outer motor is fixedly supported by the housing.

14. The power tool as defined in claim 1, wherein the tool bit is driven by using both the inner rotor and the outer rotor.

15. The power tool as defined in claim 14, comprising a speed reducing mechanism, wherein the dual rotor motor drives the tool bit via the speed reducing mechanism, and the speed reducing mechanism has at least first and second speed reduction ratios and switches at least one of the inner and outer rotors between a driven state and a stopped state to thereby switch between the first and second speed reduction ratios.

16. The power tool as defined in claim 15, wherein the switching between the speed reduction ratios is made according to any one of an electric current value, torque, rotation speed and temperature of the dual rotor motor.

17. The power tool as defined in claim 15, wherein the output torque to be outputted to the tool bit is changed by the switching between the first and second speed reduction ratios.

18. The power tool as defined in claim 17, wherein the output torque of the tool bit is intermittently changed by continuously driving one of the inner rotor and the outer rotor and intermittently driving the other rotor.

19. The power tool as defined in claim 15, wherein the rotation speed of the tool bit is changed by the switching between the first and second speed reduction ratios.

20. The power tool as defined in claim 15, wherein:
the speed reducing mechanism comprises a planetary gear mechanism,
the planetary gear mechanism includes a sun gear and an internal gear which are coaxially arranged and a planetary gear which engages with both the sun gear and the internal gear and revolves around the sun gear,
the internal gear is connected to the outer rotor and the sun gear is connected to the inner rotor,
a difference of relative rotation between the sun gear and the internal gear is controlled by control of drive of the outer rotor or the inner rotor, whereby the revolution speed of the planetary gear is changed to switch the speed reduction ratio.

21. The power tool as defined in claim 20, wherein the inner rotor is constantly driven.

22. The power tool as defined in claim 20, wherein the outer rotor is constantly driven.

23. The power tool as defined in claim 20, comprising a clutch which is disposed between the outer rotor and the internal gear or between the inner rotor and the sun gear and transmits torque from the outer rotor and the internal gear side to the tool bit side, but not in the reverse direction, wherein the clutch locks the internal gear or the sun gear against rotation according to torque on the tool bit and independently of rotation of the outer rotor or the inner rotor.

24. The power tool as defined in claim 1, wherein the outer rotor has an extending region formed on one end of the outer rotor in the longitudinal direction and extending forward of front ends of the stator and the inner rotor in the longitudinal direction, and wherein the fan is disposed inside of the extending region of the outer rotor.

25. The power tool as defined in claim 1, wherein the fan is a cooling fan for cooling the dual rotor motor and is constantly driven.

26. The power tool as defined in claim 1, wherein the fan is a cooling fan for cooling the dual rotor motor and is intermittently driven according to at least one of the temperature, rotation speed and torque of the dual rotor motor.

27. The power tool as defined in claim 1, wherein the fan is a dust collecting fan for collecting dust generated during operation and driven upon request for dust collection.

28. A power tool which performs a predetermined operation on a workpiece with a tool bit driven by a motor, wherein:
the motor comprises an inner rotor, an outer rotor and a stator having a driving coil mechanism and is configured as a dual rotor motor in which the inner rotor and the outer rotor are coaxially arranges, and
the outer rotor has an extending region formed on one end of the outer rotor in the longitudinal direction and extending forward of front ends of the stator and the inner rotor in the longitudinal direction, and wherein a fan is disposed inside of the extending region of the outer rotor.

29. The power tool as defined in claim 28, wherein the fan is disposed completely inside of the extending region of the outer rotor.

* * * * *